US012687335B2

(12) United States Patent
Lee et al.

(10) Patent No.: US 12,687,335 B2
(45) Date of Patent: Jul. 21, 2026

(54) REFRIGERATOR

(71) Applicant: LG ELECTRONICS INC., Seoul (KR)

(72) Inventors: Sunghun Lee, Seoul (KR); Daekil Kang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 83 days.

(21) Appl. No.: 18/591,716

(22) Filed: Feb. 29, 2024

(65) Prior Publication Data

US 2024/0302094 A1 Sep. 12, 2024

(30) Foreign Application Priority Data

Mar. 7, 2023 (KR) ........................ 10-2023-0029590

(51) Int. Cl.
*F25D 23/02* (2006.01)
*E05D 3/02* (2006.01)

(52) U.S. Cl.
CPC ............. *F25D 23/028* (2013.01); *E05D 3/02* (2013.01); *E05Y 2201/408* (2013.01); *E05Y 2201/412* (2013.01); *E05Y 2900/31* (2013.01); *F25D 2323/024* (2013.01)

(58) Field of Classification Search
None
See application file for complete search history.

(56) References Cited

U.S. PATENT DOCUMENTS

| | | | | |
|---|---|---|---|---|
| 4,817,240 | A * | 4/1989 | Sovis, Jr | F24C 15/023 16/322 |
| 9,903,639 | B2 | 2/2018 | Eom et al. | |
| 10,890,334 | B2 * | 1/2021 | White | E05F 1/1261 |
| 11,859,434 | B1 * | 1/2024 | Collene | E05D 3/02 |
| 2016/0097580 | A1 * | 4/2016 | Lee | F25D 23/028 312/405.1 |

FOREIGN PATENT DOCUMENTS

| | | | | | |
|---|---|---|---|---|---|
| CN | 201355169 | Y | * | 12/2009 | |
| CN | 108020012 | A | * | 5/2018 | F25D 23/028 |
| CN | 108061423 | A | * | 5/2018 | F25D 23/028 |
| CN | 113958218 | A | * | 1/2022 | E05D 11/00 |
| DE | 102014214635 | A1 | * | 1/2016 | E05D 11/1014 |
| EP | 1884614 | A2 | * | 2/2008 | E05F 1/14 |
| JP | 3953082 | B2 | | 8/2007 | |

(Continued)

*Primary Examiner* — Hanh V Tran

(74) *Attorney, Agent, or Firm* — Birch, Stewart, Kolasch & Birch, LLP

(57) ABSTRACT

A refrigerator includes a cabinet which has a storage space; a door which opens and closes the storage space; a hinge which connects the door and the cabinet and supports the door so that the door is capable of rotating; and a damping device which is provided on one side where the hinge is mounted and provides a damping force to the door when the door rotates in a closing direction, in which the damping device consists of an oil damper, and a contact surface is formed on one side corresponding to the damping device, with which the door starts to be in contact and thus to which a damping force is transmitted, at a set angle or less, and which is separated from the damping device when the door is opened.

17 Claims, 17 Drawing Sheets

(56) References Cited

FOREIGN PATENT DOCUMENTS

| | | | | | |
|---|---|---|---|---|---|
| JP | 6125923 | B2 * | 5/2017 | ................ | E05F 5/00 |
| KR | 0111198 | Y1 * | 4/1998 | ........... | F25D 23/028 |
| KR | 0142059 | B1 * | 7/1998 | | |
| KR | 100187204 | B1 * | 4/1999 | ................ | E05F 3/16 |
| KR | 0139241 | Y1 * | 5/1999 | ........... | F25D 23/028 |
| KR | 19990034855 | A * | 5/1999 | | |
| KR | 100470877 | B1 * | 2/2005 | ................ | E05F 1/10 |
| KR | 10-2005-0077554 | A | 8/2005 | | |
| KR | 101054927 | B1 * | 8/2011 | ............ | E05F 1/1207 |
| KR | 20180032841 | A * | 4/2018 | ............... | E05D 7/04 |
| KR | 101910655 | B1 * | 10/2018 | ............. | F25D 23/02 |
| KR | 10-2019-0025295 | A | 3/2019 | | |
| KR | 20220018703 | A * | 2/2022 | ........... | F25D 23/028 |
| KR | 20220018704 | A * | 2/2022 | ........... | F25D 23/028 |
| KR | 20220018705 | A * | 2/2022 | ........... | F25D 23/028 |
| KR | 10-2425367 | B1 | 7/2022 | | |
| KR | 10-2022-0168469 | A | 12/2022 | | |
| WO | WO-2012168748 | A1 * | 12/2012 | ................ | E05F 5/02 |
| WO | WO-2021177476 | A1 * | 9/2021 | ........... | F25D 23/028 |

* cited by examiner

REFRIGERATOR

CROSS-REFERENCE TO RELATED APPLICATIONS

The present application claims priority under 35 U.S.C. 119 to Korean Patent Application No. 10-2023-0029590, filed in the Republic of Korea on Mar. 7, 2023, which is hereby incorporated by reference in its entirety.

BACKGROUND

The present disclosure relates to a refrigerator.

In general, a refrigerator is a home appliance that allows food to be stored at low temperatures in an internal storage space shielded by a door. To this end, refrigerators are designed to keep stored food in optimal condition by cooling the inside of the storage space using cold air generated through heat exchange with the refrigerant circulating in the refrigeration cycle.

Recently, refrigerators are gradually becoming larger and more multi-functional in accordance with changes in eating habits and the trend of higher quality products, and refrigerators with various structures that take user convenience into consideration are being released.

When a device is provided to provide space for door storage of a refrigerator or to provide additional functions such as an ice maker or dispenser, the weight of the door increases. In addition, even when heavy materials such as glass or metal are used to enhance the outer appearance of the refrigerator door, the weight of the door increases.

When the weight of the refrigerator door increases, there is a problem that it takes a lot of effort to open and close the refrigerator door, and problems such as noise or items falling due to impact at the moment when the door is closed may occur.

Additionally, if a device is added to force the door to close, there is a problem that the closing force applied to the door is added, requiring more force when opening the door, and there is a problem that the door may be opened due to the repulsion force at the moment when the door is closed.

SUMMARY

An object of an embodiment of the present disclosure is to provide a refrigerator in which shock is alleviated by a damping device when the door is closed, while preventing resistance from the damping device from acting when the door is opened.

An object of an embodiment of the present disclosure is to provide a refrigerator that can prevent minute opening of the door while closing at a constant speed.

An object of an embodiment of the present disclosure is to provide a refrigerator that allows the door to close at a constant speed in response to various door weights and the user's door rotational speed.

An object of an embodiment of the present disclosure is to provide a refrigerator that can automatically close the door at a set angle and at the same time relieve the impact when the door is closed.

A refrigerator according to the present disclosure includes a cabinet which has a storage space; a door which opens and closes the storage space; a hinge which connects the door and the cabinet and supports the door so that the door is capable of rotating; and a damping device which is provided on one side where the hinge is mounted and provides a damping force to the door when the door rotates in a closing direction, in which the damping device may consist of an oil damper, and a contact surface may be formed on one side corresponding to the damping device, with which the door starts to be in contact and thus to which a damping force is transmitted, at a set angle $\alpha 2$ or less, and which is separated from the damping device when the door is opened.

The contact surface may include a pressing part which extends to increase the distance from the hinge shaft in the direction in which the door is closed and forms a section in which a damping force is gradually increased as the door is in contact with the damping device; a restraining part which maintains contact with the damping device when the door is closed; and a holding part which is formed between the pressing part and the restraining part and extends so that a distance from the hinge shaft does not increase in the rotational direction in which the door is closed.

The distance of the starting point of the holding part from the hinge shaft and the distance of the ending point of the holding part from the hinge shaft may be the same.

The oil damper may include a housing in which a space for accommodating oil is located, a push member which moves in contact with the door; a piston which moves within the space as the push member moves and has an orifice through which oil passes; and an elastic member which provides elastic force to the piston, and in which the push member may be formed so that the center portion of the contact part which is in contact with the contact surface protrudes the most.

The contact part and the holding part may be formed to have corresponding inclinations or curvatures.

The holding part may further protrude in the direction in which the damping device is disposed than in the direction in which the restraining part and the pressing part are disposed.

The restraining part may extend to increase the distance from the hinge shaft in the direction in which the door is closed, and the distance difference between the starting point and the ending point from the hinge shaft of the constraining part may be smaller than the distance difference between the starting point and the ending point from the hinge shaft of the pressing part.

The contact surface may further include a starting part which is in contact with the damping device when the door reaches the set angle $\alpha 2$, and extends such that the distance from the hinge shaft does not increase in the rotational direction in which the door is closed, and thus the pressing part may extend from an end portion of the starting part.

The distance of the starting point of the starting part from the hinge shaft and the distance of the ending point of the starting part from the hinge shaft may be the same.

The extended length of the starting part may be formed to be longer than the extended length of the holding part.

The starting part may be formed at an angle of 40° to 32° from the hinge shaft in the direction in which the door is closed, the pressing part may be formed at an angle of 32° to 7° from the hinge shaft in the direction in which the door is closed, the holding part may be formed at an angle of 7° to 4° from the hinge shaft in the direction in which the door is closed, and the restraining part may be formed at an angle of 4° to 0° from the hinge shaft in the direction in which the door is closed.

The hinge may include a hinge bracket which is mounted on the front surface of the cabinet; and a hinge plate which extends in a direction crossing the hinge bracket and provided with a hinge shaft that is axially coupled to the door, and the hinge plate may be formed in a plate shape, and the contact surface may be formed along a circumferential surface of the hinge plate.

The damping device may be disposed on a side facing the circumferential surface of the hinge plate, and the damping device may be in contact with the hinge plate when the door rotates in the closing direction and be spaced apart from the hinge plate when the door rotates in the opening direction.

An auto-closing device may be provided on the door, which rotates the door to automatically close at a set angle $\alpha 1$ or less.

The set angle $\alpha 1$ may be greater than the set angle $\alpha 2$ at which contact between the damping device and the contact surface starts.

The door may include a cap decoration forming a lower surface thereof, the hinge may be axially coupled to the cap decoration, and the damping device may be mounted on the cap decoration, and may be in contact with the contact surface formed on the hinge.

The hinge may include a hinge bracket mounted on the cabinet, and a hinge plate protruding from the hinge bracket and provided with the hinge shaft, and the contact surface may be formed on the hinge bracket.

The cap decoration may further include a shielding part extending past the front of the hinge and the damping device and protruding downward from the cap decoration to shield at least a portion of the hinge and the damping device.

The hinge and damping devices may be disposed side by side on the upper surface of the cabinet, the damping device may protrude toward the rear surface of the door, and the contact surface may be formed on the rear surface of the door.

The hinge may include a hinge plate coupled to the cabinet; a hinge shaft which protrudes from the hinge plate and is axially coupled with the door; and a hinge cover which accommodates the hinge plate and the hinge shaft, and an opening through which the damping device protrudes forward may be formed in the hinge cover.

The refrigerator according to an embodiment of the present disclosure has the following effects.

According to the present embodiment, even when the weight of the door is heavy or the user's door rotational speed is high, when the door is closed at a set angle or less, there is an advantage that the closing speed of the door is capable of being reduced by damping of the damping device to reduce shock and noise, and falling of food is capable of being prevented.

In particular, the damping device is composed of a hydraulic damper and has the advantage of ensuring convenience and stability by providing a constant closing speed despite various changes in the weight of the door and the user's door rotational speed.

In addition, there is an advantage that the damping device automatically closes the door by an auto-closing device when the door is at the set angle or less, and a damping force is applied by the damping device at a set angle smaller than the set angle, and thus both automatic closing and door buffering are possible.

In addition, the contact surface with which the damping device is in contact includes a starting part, and there is an advantage in ensuring a smooth closing operation and deceleration of the door by preventing excessive oil resistance from occurring momentarily when the damping device starts contacting.

In addition, there is an advantage that the contact surface is formed with a holding part between the pressurizing part and the restraining part, thereby preventing the damping force of the damping device from increasing before the door is finally closed, thereby ensuring that the door is completely closed and preventing minute opening.

In addition, the holding part protrudes beyond the pressing part and the restraining part, so that the damping device and the contact surface can be separated from each other at the moment when the door is opened from a closed state. Accordingly, when the door is opened, the resistance force of the oil generated by the damping device is not applied, which has the advantage of making it easier to open the door.

DETAILED DESCRIPTION OF THE EMBODIMENTS

Hereinafter, specific embodiments of the present disclosure will be described in detail along with the drawings. However, the present disclosure cannot be said to be limited to the embodiments in which the idea of the present disclosure is presented, and other disclosures that are regressive or other embodiments included within the scope of the present disclosure can be easily suggested by adding, changing, or deleting other components.

Before explaining the embodiments, various directions are defined. In an embodiment of the present disclosure, the direction in which a front surface of the door illustrated in FIG. 1 faces may be referred to as a front direction, the direction toward the cabinet based on the front surface of the door may be referred to as a rear direction, the direction toward the floor where the refrigerator is installed may be referred to as a lower direction, and the direction away from the floor may be referred to as an upper direction. In addition, when indicating a previously undefined direction, the direction can be defined and explained based on each drawing.

Figure 1:
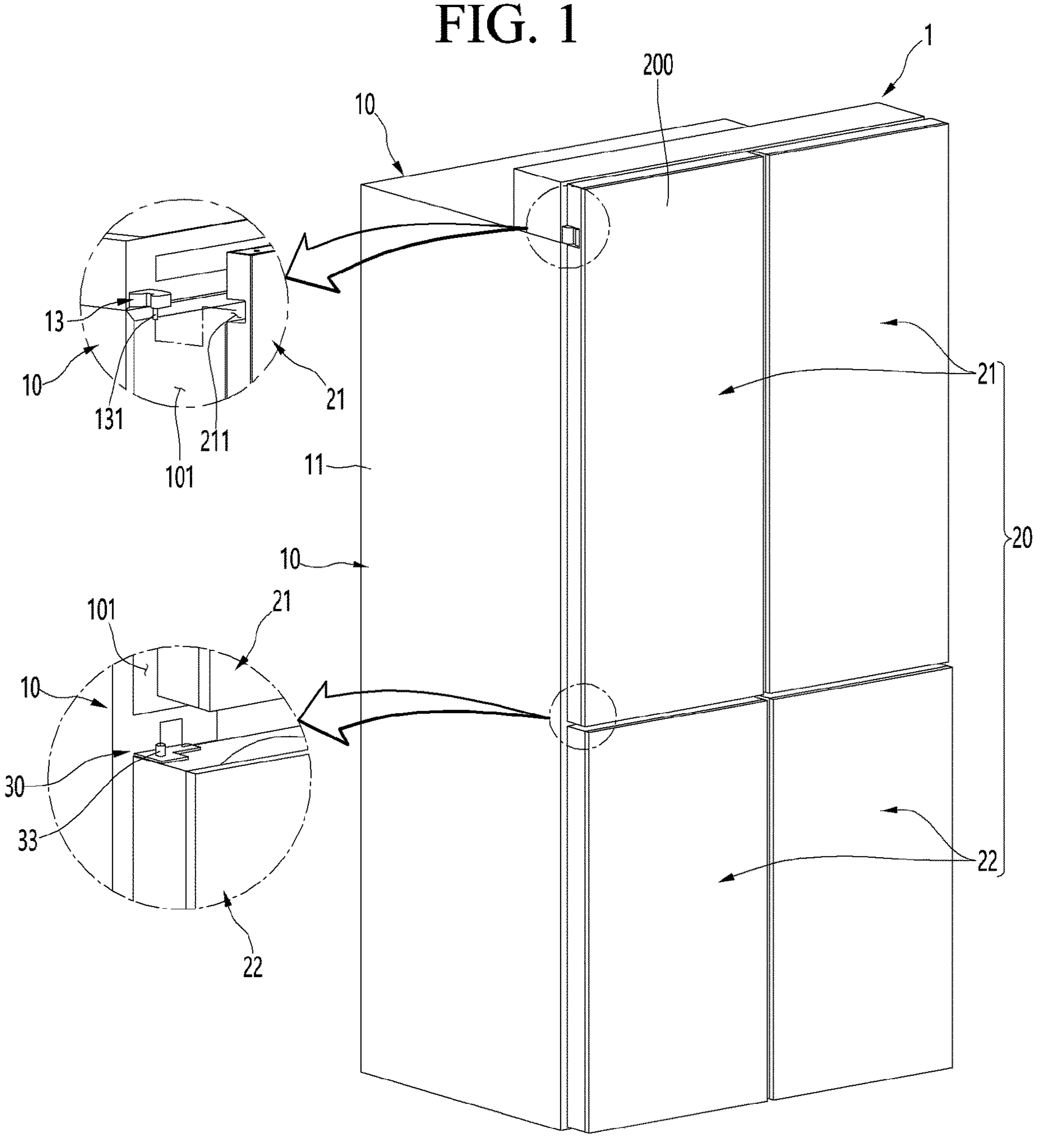
FIG. 1 is a perspective view illustrating a refrigerator according to an embodiment of the present disclosure.

FIG. 1 is a perspective view illustrating a refrigerator according to an embodiment of the present disclosure.

As illustrated in the drawing, the overall outer appearance of the refrigerator 1 according to an embodiment of the present disclosure may be formed by a cabinet 10 forming a storage space with an open front surface, and a door 20 opening and closing the storage space.

The cabinet 10 may be formed in a hexahedral shape with an open front surface and may include an upper surface, a lower surface, left and right sides, and a rear surface. At this time, each side of the cabinet 10 may be connected to each other in at least one configuration.

A storage space 101 may be formed inside the cabinet 10. The inner surface of the cabinet 10 may be divided up and down to form a plurality of storage spaces. For example, the storage space 101 may be divided into an upper refrigerating chamber and a lower freezing chamber.

A door 20 may be provided in front of the cabinet 10. There may be a plurality of doors 20, and each door 20 may be configured to independently open and close the storage space 101. As an example, the door 20 may include an upper door 21 disposed at the upper portion and a lower door 22 disposed at the lower portion. A pair of the upper doors may be disposed to be rotatable to both left and right sides. The upper door 21 may be referred to as a refrigerating chamber door. A pair of the lower doors may be disposed to be rotatable to both left and right sides. The lower door 22 may be referred to as a freezing chamber door.

The door 20 may be configured in various ways according to the disposition of the storage space. In the present embodiment, an example provided with four doors will be described, but it should be noted in advance that the present disclosure is applicable to all refrigerators equipped with at least one rotating door.

The door 20 may have a rotatable structure in which the upper and lower ends are axially coupled and may be referred to as a rotating door. Hereinafter, we will look at the mounting structure based on the upper door 21. In addition, the upper door 21 may be referred to as a door 20.

The door 20 may be rotatably mounted on the cabinet 10 using a first hinge 13 and a second hinge 30. Additionally, the door 20 can form the outer appearance of the front surface of the refrigerator 1 in a closed state. A panel 200 forming the outer appearance may be provided on the front surface of the door 20. For example, the panel 200 may be made of glass. In addition, a door storage member may be further provided at the rear surface of the door 20. In addition, if necessary, the door 20 may be equipped with a dispenser, an ice maker, and the like.

The door 20 may extend further upward of the cabinet 10 and may be rotatable by the first hinge 13 mounted on the cabinet 10. The first hinge 13 may rotatably connect the upper portion of the door 20 to the cabinet 10. Additionally, the first hinge 13 may be fixed to one of the left and right ends of the upper surface of the cabinet 10.

The first hinge 13 may include a first hinge shaft 131 protruding downward. In addition, the first hinge shaft 131 may be axially coupled to the hinge mounting part 211 formed on the upper portion of the door 20.

The second hinge 30 is provided on the front surface of the cabinet 10 and can rotatably support the door 20 from below. The second hinge 30 may be located on one of the left and right sides of the front surface of the cabinet 10 and may be mounted in the same direction as the first hinge 13.

Additionally, the second hinge 30 may include a second hinge shaft 33 protruding upward. The second hinge shaft 33 may be connected through the lower end of the door 20. Accordingly, the door 20 can be rotated based on the first hinge shaft 131 and the second hinge shaft 33. In addition, the first hinge shaft 131 and the second hinge shaft 33 may be located on the same extension line as the rotation center of the door 20.

In an embodiment of the present disclosure, the second hinge 30 can rotatably support the door 20 regardless of the position of the door 20. Additionally, the auto-closing device 25 and the damping device 26 including the second hinge 30 may be placed at the upper end of the door 20.

Hereinafter, the second hinge 30 and the related structures thereof will be described, and for convenience of explanation, the second hinge 30 will be referred to as the hinge 30.

Figure 2:
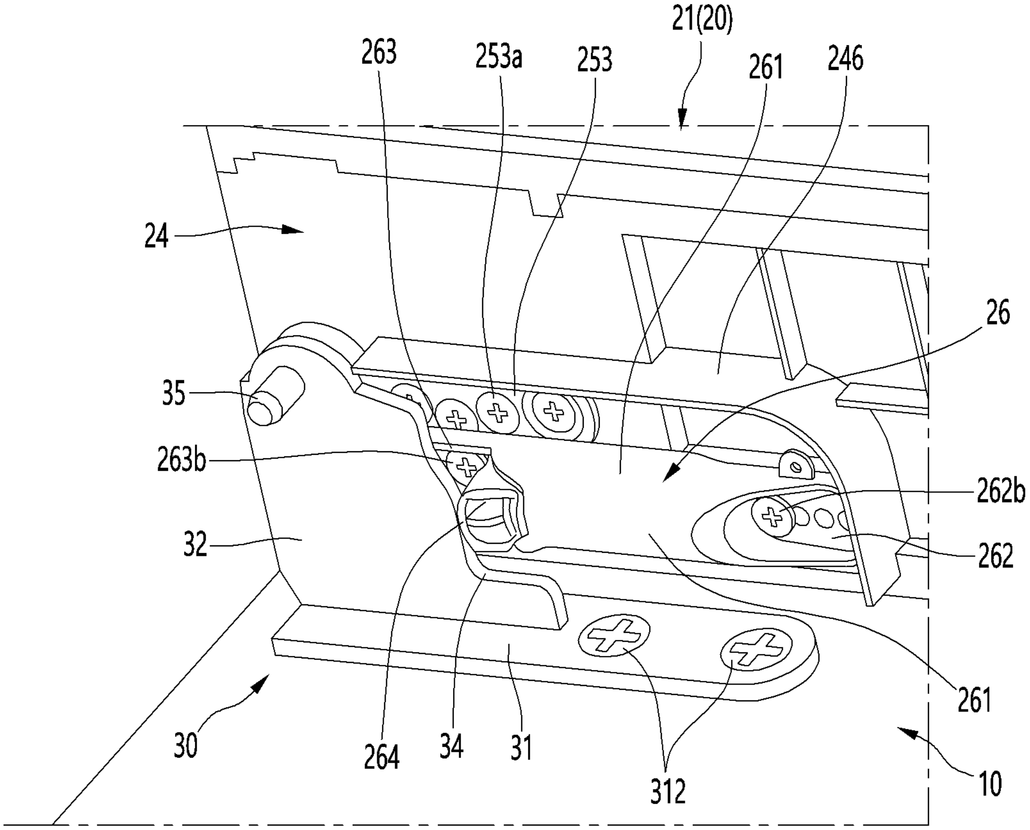
FIG. 2 is a partial perspective view illustrating the lower end of the door of the refrigerator.
Figure 3:
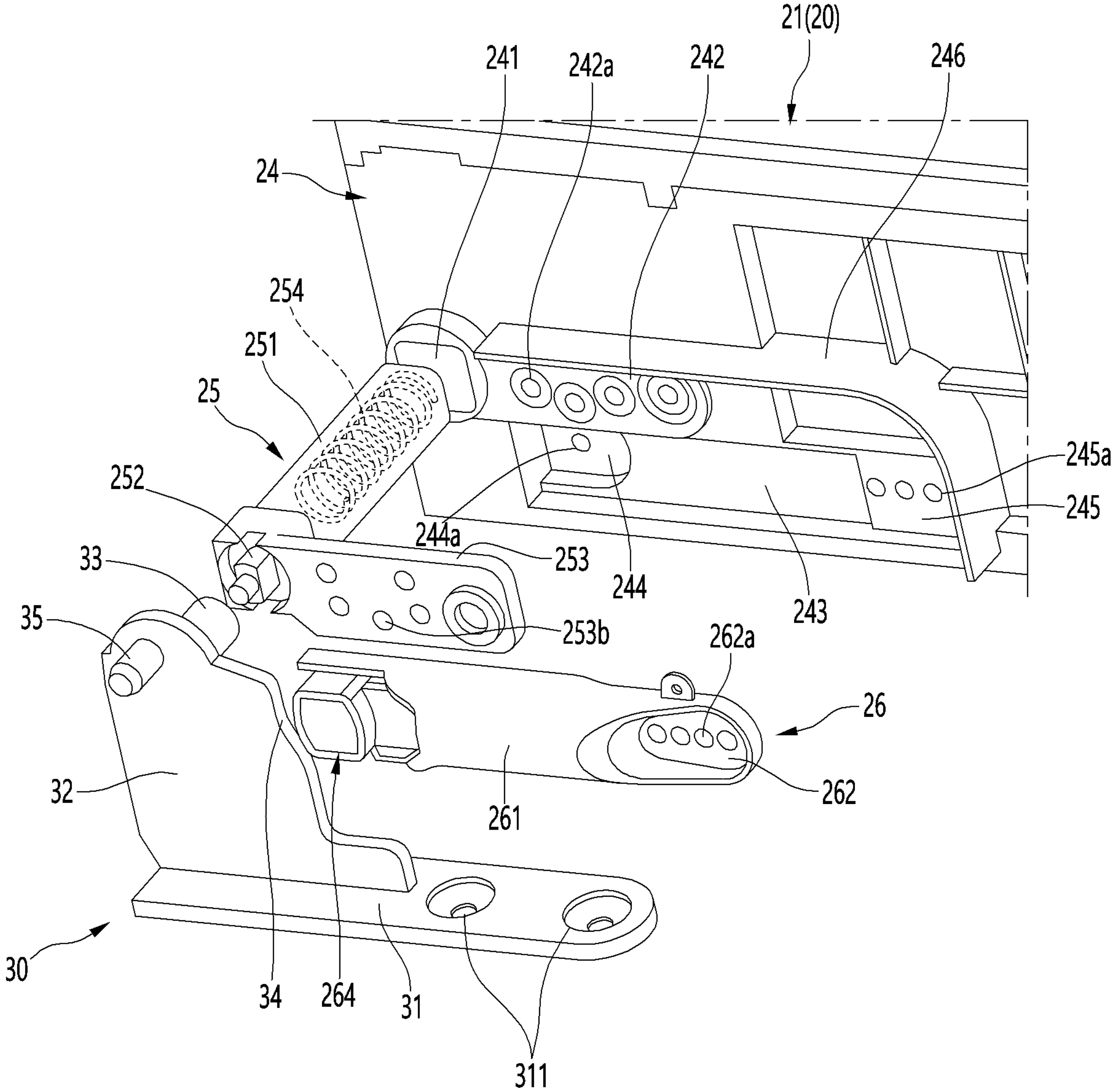
FIG. 3 is an exploded perspective view illustrating the combined structure of the auto-closing device, damping device, and hinge in FIG. 2.

FIG. 2 is a partial perspective view illustrating the lower end of the door of the refrigerator, and FIG. 3 is an exploded perspective view illustrating the combined structure of the auto-closing device, damping device, and hinge in FIG. 2.

As illustrated, cap decoration 24 may be provided on the upper and lower surfaces of the door 20. As an example, the cap decoration 24 forms the lower surface of the door, and the hinge 30 and the damping device 26 may be mounted on the cap decoration. In addition, the cap decoration 24 may be further equipped with an auto-closing device 25.

In detail, the auto-closing device 25 may be mounted on the cap decoration 24. The auto-closing device 25 can automatically close the door 20 by adding force in the process of closing the door 20. As an example, the auto-closing device 25 may be located on the same extension line as the rotation center of the door 20 and may be combined with the hinge 30 to serve as the rotation shaft of the door 20.

The auto-closing device 25 may include a case 251. The case 251 extends vertically and may be inserted into the door 20. A spring 255 may be accommodated inside the case 251. The case 251 is provided with a shaft coupling part 252, and the shaft coupling part 252 may be connected to the spring 255. The shaft coupling part 252 may be exposed below the case 251. The shaft coupling part 252 may be coupled to the hinge shaft 33 formed on the hinge 30 when the door 20 is mounted, and may rotate together when the door 20 rotates.

The spring 255 is formed in a coil spring structure and can be compressed or tensioned according to the rotation of the shaft coupling part 252. The spring 255 may act when the door 20 is at a set angle ($\alpha 1$ in FIG. 6) or less to provide elastic force so that the door 20 can be completely closed. In addition, the auto-closing device 25 can prevent elastic force from being applied in the process of rotating the door 20 to open the door due to the structure of the case 251 and the shaft coupling part 252.

The auto-closing device 25 is only an embodiment of the present disclosure, and various other structures provided on the door 20 or the hinge 30 may be applied to enable the door 20 to automatically close.

Meanwhile, a laterally extending case bracket 253 may be formed at the lower end of the case 251. The case bracket 253 can be firmly fixed to the cap decoration 24 by fastening screws 253*a*.

A case insertion hole 241 and a case mounting part 242 on which the auto-closing device 25 is mounted may be formed on the lower surface of the cap decoration 24. The case insertion hole 241 may be formed on the same extension line as the rotation center of the door 20. In addition, the case insertion hole is formed in a shape corresponding to the cross-sectional shape of the case 251, so that the case 251 can be fixed in the inserted state.

Additionally, a case mounting part 242 may be further formed on the lower surface of the cap decoration 24. The case bracket 253 may be mounted on the case mounting part 242. A plurality of screw holes 242*a* are formed in the case mounting part 242, and a screw 253*a* penetrating the screw hole 253*b* of the case bracket 253 can be fastened.

A hinge 30 may be mounted on the cabinet 10. Additionally, the lower end of the door 20 may be rotatably mounted on the hinge 30. The hinge 30 may be made of a metal material with excellent strength. The hinge 30 may be formed of a hinge bracket 31 and a hinge plate 32. The hinge bracket 31 may be fixedly mounted on the front surface of the cabinet 10. A plurality of screw holes 311 may be formed in the hinge bracket 31, and screws 312 may be fastened to the screw holes 311 to secure the hinge 30 to the cabinet 10.

The hinge plate 32 may extend in a direction crossing the hinge bracket 31. The hinge plate 32 may be formed to have a predetermined thickness, and a contact surface 34 with which the damping device 26 is in contact may be formed around the hinge plate 32.

Additionally, a hinge shaft 33 may be formed on the hinge plate 32. The hinge shaft 33 may protrude from above and be coupled to the shaft coupling part 252. In other words, in the auto-closing device 25, the shaft coupling part 252 rotates about the hinge shaft 33 as the door 20 rotates, and at this time, the elastic force of the elastic member 265 acts and thus the door 20 can be forced to rotate in the closing direction.

Meanwhile, when the hinge 30 is disposed between the upper door 21 and the lower door 22, the hinge 30 can rotatably support the upper end of the lower door 22. For example, a hinge shaft 35 protruding downward may be further formed on the lower surface of the hinge plate 32, and the hinge shaft 35 may be axially coupled to the upper end of the lower door 22. According to the mounting position of the hinge 30 and the disposition state of the door 20, the hinge shaft 35 protruding downward from the hinge plate 32 may be omitted.

The cap decoration 24 may be provided with the damping device 26. The damping device 26 regulates the closing speed of the door 20 and exerts a damping force due to resistance when oil flows inside, so the damping device may be referred to as a hydraulic damper or an oil damper.

The damping device 26 is disposed on one side of the hinge plate 32 and may be selectively in contact with the hinge plate 32 when the door 20 rotates. The damping device 26 may be selectively pressed by the hinge plate 32 according to the rotation angle of the door 20 when the door 20 rotates in the closing direction. In addition, the door 20 can be closed at a constant speed by the damping force of the damping device 26. Additionally, the damping device 26 and the hinge plate 32 can prevent the door 20 from being opened again due to a repulsive force at the moment when the door 20 is completely closed. The structure of the damping device 26 will be discussed in more detail below.

A damper mounting part 243 for mounting the damping device 26 may be formed on the cap decoration 24. The damper mounting part 243 may be formed at a position corresponding to the side of the hinge plate 32 and may be recessed to accommodate at least a portion of the housing 261 of the damping device 26.

In addition, a first mounting part 244 and a second mounting part 245 to which both ends of the housing 261 are fixed may be formed on both sides of the damper mounting part 243. Screw holes 245*a* may be formed in the first mounting part 244 and the second mounting part 245, and screws 262*b* and 263*b* that penetrate the housing 261 and thus fastened are fastened so that the damping device 26 may be firmly fixed. Meanwhile, a plurality of screw holes 245*a* may be provided in the longitudinal direction of the damping device 26. Therefore, the position of the damping device 26 may be adjusted and mounted according to the type of the door 20, and thus the damping device can be applied to various types of doors 20. Additionally, damping devices 26 having different lengths or strokes of the push members 264 may be selectively mounted.

A shielding part 246 may be further formed on the cap decoration 24. The shielding part 246 may protrude downward from the lower surface of the cap decoration 24 and may protrude further downward than the damping device 26. Accordingly, the damping device 26 can be prevented from being exposed when viewed from the front.

The shielding part 246 may extend longer than the side end of the damping device 26 and may extend rearward from the extended end portion to prevent the damping device 26 from being exposed to the side. The shielding part 246 extends from the left end of the damping device 26 (as seen in FIG. 3) to the right end thereof, and the extended end portion may be bent to extend to the rear end of the cap decoration 24. As an example, the shielding part 246 may be formed to shield both the case mounting part 242 and the damper mounting part 243.

The cap decoration 24 may be formed of a plastic material, and the case mounting part 242 and the damper mounting part 243, including the shielding part 246, may be molded into one piece. Accordingly, the damping device 26 and the auto-closing device 25 can be mounted on the cap decoration 24 in a molded and assembled state. The door 20 may be rotatably coupled to the hinge 30 in a state where the damping device 26 and the auto-closing device 25 are mounted thereon.

Hereinafter, the damping device 26 will be discussed in more detail with reference to the drawings.

Figure 4:
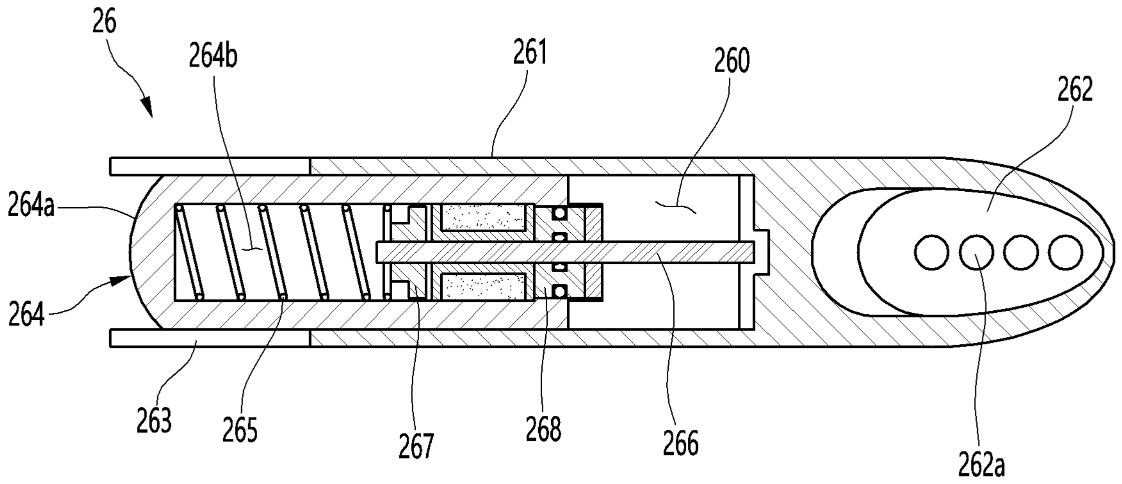
FIG. 4 is a cross-sectional view illustrating the damping device.

FIG. 4 is a cross-sectional view illustrating the damping device.

As illustrated, the external shape of the damping device 26 may be formed by the housing 261. In addition, the housing 261 may be formed with an accommodation space 260 that is open on one side. In addition, a push member 264 can be accommodated inside the accommodation space 260. The housing 261 is open at one end so that the push member 264 can be inserted, and the push member 264 can be protruded or inserted through the open end portion of the housing 261.

A first coupling part 263 mounted on the first mounting part 244 may be formed at one end of the housing 261 based on the center. A screw 263*b* is fastened to the first coupling part 263 to fix one end of the housing 261 to the cap decoration 24. Additionally, a second coupling part 262 mounted on the second mounting part 245 may be formed on the other end of the housing 261. A plurality of screw holes 262*a* may be formed in the second coupling part 262, and a screw 262*b* may be fastened to the second coupling part 262 to fix the other end of the housing 261 to the cap decoration 24. Meanwhile, the fixed position of the damping device 26 can be determined through a combination of positions of the plurality of screw holes 262*b* and 245*a*.

The damping device 26 may include the push member 264. The push member 264 may be inserted into the accommodation space 260. In addition, the push member 264 may include a contact part 264*a* in contact with the hinge plate 32. The contact part 264*a* may be formed in a shape that protrudes at the center and becomes lower toward both ends. Accordingly, the protruding central portion of the contact part 264*a* is in contact with the contact surface 34 and thus a force may be applied in a direction intersecting the tangent line of the contact surface 34, that is, in the insertion direction of the push member 264. In addition, both ends of the push member 264 may be formed in a lowered shape with respect to the central portion thereof to prevent unnecessary interference with points other than one point of the contact surface in the process of rotating the door 20 and the damping device 26.

For example, the contact part 264*a* may be formed in a curved shape. The contact part 264*a* may be formed to have a curvature corresponding to the contact surface 34.

One end of the push member 264 may be exposed to the outside of the housing 261, and the other end thereof may maintain a state of being inserted into the accommodation space 260. In addition, when the push member 264 is pressed, the push member 264 may be inserted while being buffered by the flow of oil inside the damping device 26. In addition, the push member 264 may be supported by a spring 265 inside the housing 261, and when the push member 264 is not pressed, the push member may be maintained in a protruding state to the initial position thereof by the restoring force of the spring 265.

Meanwhile, a buffer space 264*b* with one end open may be formed inside the push member 264. Additionally, a piston 267 may be movably disposed within the buffer space 264*b*, and the open end portion of the push member 264 may be shielded by a sealing member 268. At this time, the piston 267 may be supported by the elastic member 265 within the buffer space 264*b*. Additionally, the buffer space 264*b* may be filled with oil for damping. In addition, a rod 266 may be connected to the piston 267, and the rod 266 may passe through the sealing member 268, extend to the outside of the push member 264, and be fixed to the inside of the housing 261. The buffer space 264*b* may be formed in the accommodation space 260 as needed. Additionally, the buffer space 264*b* may be located inside the housing 261, that is, within the accommodation space 260.

The state in FIG. 4 is the most protruding state, and when the end portion of the push member 264 is pressed in this state, while the push member 264 may move to the right (as seen in FIG. 4), the push member may be inserted into the inside of the housing 261. At this time, the push member 264 moves along the rod 266, and the piston 267 may relatively move to the left (as seen in FIG. 4) within the buffer space 264*b*. In addition, the oil in the buffer space 264*b* moves into the space between the piston 267 and the sealing member 268 along the orifice formed in the piston 267. The oil in the buffer space 264*b* flows at a constant flow rate along the orifice, thereby providing a constant oil resistance. Accordingly, the push member 264 moves inside the housing 261 at a constant speed, and thus the door 20 may be closed at a constant speed.

In addition, when the push member 264 is moved in the insertion direction, the elastic member 265 may be compressed, and when the external force applied to the push member 264 is removed, the push member 264 returns to the original position thereof by the elasticity of the elastic member 265, and the oil between the piston 267 and the sealing member 268 may flow toward the buffer space 264*b* again. The push member 264 may be moved while inserted into the housing 261, and the stroke protruding out of the housing 261 may be set to a length that can maintain a state of being in contact with the contact surface 34.

Meanwhile, at least one structure of the housing 261, the push member 264, the piston 267, the sealing member 268, and the rod 266 that constitute the buffer member may have various other structures in addition to the present embodiment. In other words, the oil damping structure for buffering and constant velocity movement of the push member 264 in contact with the contact surface 34 may be applied in various ways.

Hereinafter, the hinge 30 will be discussed in more detail with reference to the drawings.

Figure 5:
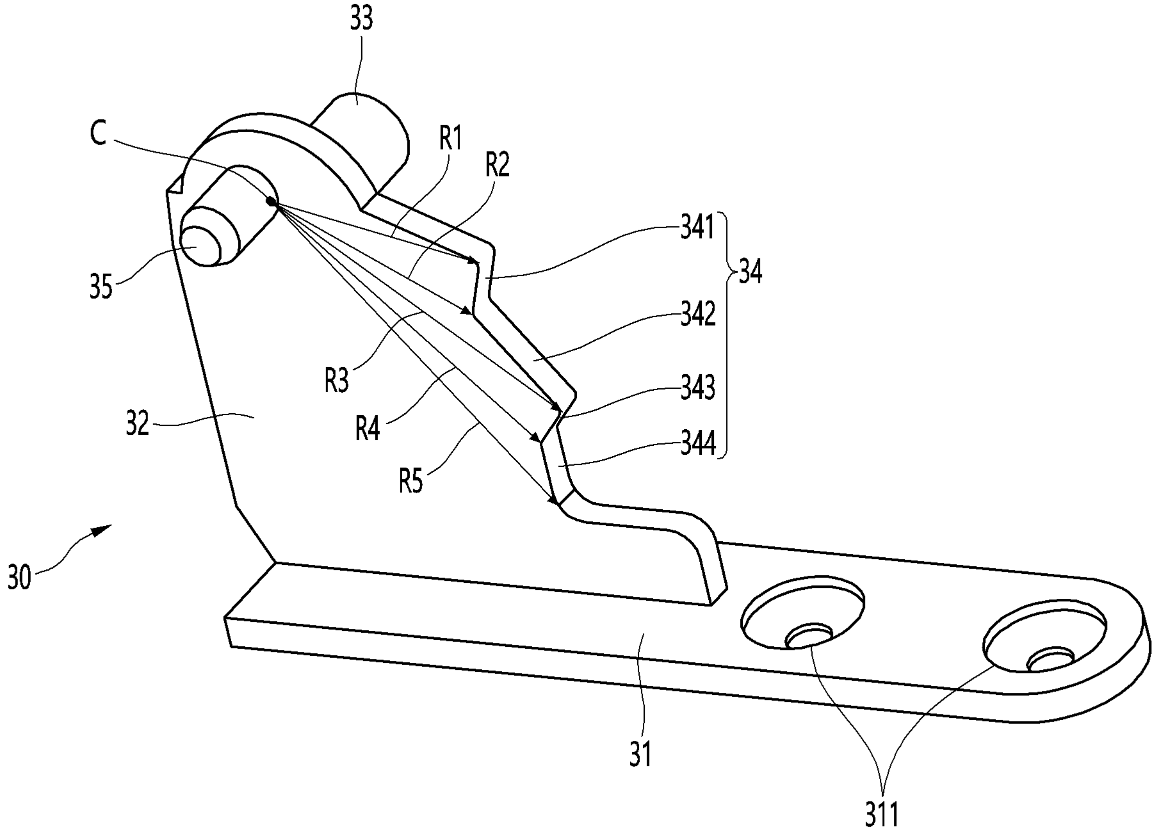
FIG. 5 is a perspective view illustrating the hinge.
Figure 6:
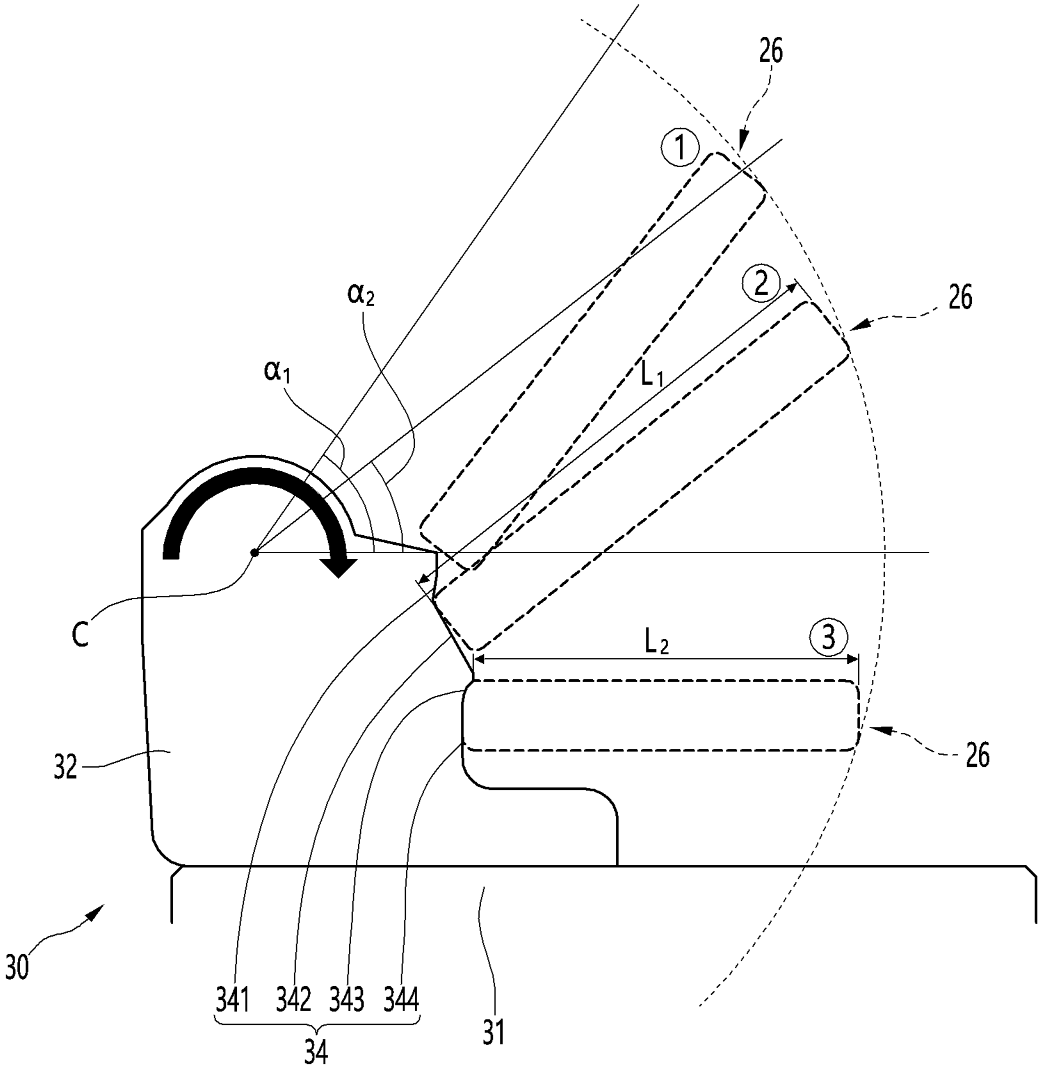
FIG. 6 is a view illustrating the operating range of the auto-closing device and damping device according to the rotation angle of the door.

FIG. 5 is a perspective view illustrating the hinge, and FIG. 6 is a view illustrating the operating range of the auto-closing device and damping device according to the rotation angle of the door.

As illustrated, the hinge 30 may include the hinge bracket 31 and the hinge plate 32. The hinge plate 32 may be formed in a plate shape with a predetermined thickness. In addition, the contact surface 34 may be formed on a circumference facing the damping device 26 of the edge of the hinge plate 32.

In detail, the contact surface 34 with which the push member 264 is in contact may be formed on a portion of the entire circumferential surface of the hinge plate 32 according to the opening and closing angle of the door 20. The contact surface 34 may be partially formed to contact the damping device 26 in a state where the door 20 is opened at the set angle $\alpha 2$ or less of the entire surface, of the hinge plate 32.

In addition, the remaining circumferential surface of the hinge plate 32 on which the contact surface 34 is not formed may form a section that is not in contact with the damping device 26.

In detail, in a state where the door 20 is completely open, the door 20 is closed by a user's rotation operation up to the set angle $\alpha 1$. For example, the set angle $\alpha 1$ may be approximately 55°. In addition, when the door 20 is closed at the set angle $\alpha 1$ or less, the auto-closing device 25 starts operating, and the door 20 may be closed without user manipulation by the auto-closing device 25. In other words, the auto-closing device 25 operates at an angle between approximately 55° and 0° based on the closed state of the door 20, allowing the door 20 to close without separate manipulation. In particular, when the auto-closing device 25 starts operating, the damping device 26 and the hinge plate 32 may not be in contact with each other to ensure smooth closing of the door 20. In addition, when the door 20 reaches the set angle $\alpha 1$, contact between the door and the first part 341 of the contact surface 34 may start. At this time, as a preparatory step for the actual action of the damping force, only a slight damping force is applied and no damping for decelerating the door 20 is actually performed (State ①) in FIG. 6).

In addition, in the process of closing the door 20, when the set angle $\alpha 2$ or less is reached, the push member 264 may be in contact with the contact surface 34 to provide a damping effect (state ② in FIG. 6). At this time, the damping device 26 does not participate in the rotation of the door 20 when the door 20 is opened at a set angle $\alpha 2$ or more. For example, the set angle $\alpha 2$ may be approximately 30° to 40°. In other words, in the process of automatically closing the door 20 by the auto-closing device, the damping device 26 starts to be in contact with the second part 342 of the contact surface 34, and the door 20 is closed at a constant speed. In addition, when the door 20 is finally completely closed, the damping device 26 is in contact with the fourth part 344 of the contact surface 34 (State ③ in FIG. 6).

To enable the door 20 to be closed more stably and smoothly, the contact surface 34 may be composed of multiple sections that play different roles. The push member 264 may pass through each section of the contact surface in a state of contact in the process of opening and closing the door 20. At this time, the damping device 26 provides a damping force based on oil resistance so that the door 20 may be closed at a constant speed even under various weight states and various closing operation conditions. In particular, in a situation where the door 20 is being closed while being accelerated by the auto-closing device 25, the speed of the door 20 is reduced, thereby ensuring a smooth closing operation of the door 20, but reducing the impact at the moment when the door 20 is closed.

In detail, the contact surface 34 may include a first part 341 that starts contact with the push member 264 when the door 20 is closed, and a second part 342, a third part 343, and a fourth part 344, sequentially passing through the first part 341 and when the door 20 is completely closed, the push member 264 may maintain a state of being in contact with the fourth part 344.

The first part 341 is a portion with which the push member 264 is first in contact in the process of closing the door 20. Since the first part 341 starts contact with the push member 264, the first part may be referred to as a starting part 341. In addition, the first part 341 may be located at the uppermost end of the contact surface 34 (as seen in FIG. 5). For example, the first part 341 may be a section that is in contact with the push member 264 when the door 20 is opened approximately 40° to 32° relative to the closed state. Among the entire contact surfaces, the section where the first part 341 is formed may be referred to as a first section, a first rounded portion, or an entry section.

In addition, the distance R1 from the rotation center c of the door 20, that is, the rotation axis to the starting point of the first part 341 may be the same as the distance R2 from the rotation axis to the ending point of the first part 341. In other words, the portion from the starting point to the ending point of the first part 341 may be formed to have the same radius from the rotation axis. Of course, the first part 341 may be formed to connect the starting point of the first part 341 and the ending point of the first part 341 with a straight line. Additionally, the slope between the upper starting point and the lower ending point of the first part 341 may be smaller than the slope of the third part 343, which will be described below. Additionally, the length between the starting and ending points of the first part 341 may be longer than that of the third part 343.

Meanwhile, the push member 264 may have a maximum stroke length before contact with the second part 342. Additionally, the length L1 between the end portion of the push member 264 and the end portion of the damping device 26 may be maximized. In addition, this length may be the same as the length when the push member 264 is not in contact with the contact surface 34.

The second part 342 is connected to the ending point of the first part 341 and may be formed below the first part 341. The second part 342 is in contact with the push member 264 to provide damping force and substantially pressurizes the push member 264, so the second part may be referred to as a pressing part 342. The second part 342 may be a section that is in contact with the push member 264 when the door 20 is opened approximately 32° to 7° relative to the closed state. Among the entire contact surfaces 34, the section where the second part 342 is formed may be referred to as a second section or a variable section.

In addition, the distance R3 from the rotation center c of the door 20 to the ending point of the second part 342 may be greater than the distance R2 from the rotation center c of the door 20 to the starting point of the second part 342. In other words, a portion from the starting point to the ending point of the second part 342 may be formed to gradually move away from the rotation axis. As an example, the second part 342 may be formed to connect a starting point and an ending point with a straight line. Of course, at least a portion of the second part 342 may be formed in a round shape.

The third part 343 may be connected to the ending point of the second part 342 and may be formed below the second part 342. The third part 343 does not additionally press the push member 264 to increase the damping force in a state of being in contact with the push member 264, and therefore the third part may be referred to as a holding part 343.

The third part 343 may be a section that is in contact with the push member 264 when the door 20 is opened approximately 7° to 4° based on the closed state. Among the entire contact surfaces 34, the section where the third part 343 is formed may be referred to as a third section, a second rounded portion, or an invariant section.

In addition, the distance R3 from the rotation axis of the door 20 to the starting point of the third part 343 may be equal to the distance R4 from the rotation axis of the door to the ending point of the third part 343. In other words, a portion from the starting point to the ending point of the third part 343 may be formed to have the same radius from the rotation axis. Of course, the third part 343 may be formed to connect the starting point of the third part 343 and the ending point of the third part 343 with a straight line.

Additionally, the slope between the upper starting point and the lower ending point of the third part 343 may be greater than the slope of the first part 341, which will be described below. Additionally, the length between the starting and ending points of the third part 343 may be shorter than that of the first part 341.

The fourth part 344 is connected to the ending point of the third part 343 and may be formed below the third part 343. The fourth part 344 may be referred to as a restraining part 344 because the push member 264 is maintained in close contact with the elastic member 265 when the door 20 is completely closed.

In addition, the fourth part 344 may form the last section of the contact surface 34. For example, the fourth part 344 may be a section that is in contact with the push member 264 when the door 20 is rotated approximately 4° to 0° based on the closed state. Among the entire contact surfaces 34, the section where the fourth part 344 is formed may be referred to as a fourth section or a stop section.

In addition, the distance R5 from the rotation center c of the door 20 to the ending point of the fourth part 344 may be greater than the distance R4 from the rotation center c of the door to the starting point of the fourth part 344. In other words, a portion from the starting point to the ending point of the fourth part 344 may be formed to gradually move away from the rotation axis. The fourth part 344 may be formed to connect a starting point and an ending point with a straight line. Of course, if necessary, at least a portion of the fourth part 344 may be formed in a round shape with a curvature.

The fourth part 344 is formed in a size that may accommodate the end portion of the push member 264. At this time, the third part 343 is in contact with one edge of the push member 264 so that the door 20 may be formed to stably accommodate the push member 264 in a closed state.

In addition, the distance difference between the starting point and the ending point from the hinge shaft of the fourth part 344 may be smaller than the distance difference between the starting point and the ending point from the hinge shaft of the second part 342. Accordingly, the damping device 26 in the fourth part 344 provides a relatively smaller damping force to the door 20, thereby ensuring that the door 20 is stably closed.

In addition, when the push member 264 is in contact with the fourth part, the stroke of the push member 264 becomes the shortest. Accordingly, the length L2 from one end portion of the push member 264 to the other end portion of the damping device 26 can be minimized.

Meanwhile, the contact surface 34 may be composed of only the second part 342, the third part 343, and the fourth part 343. In addition to the second part 342, third part 343, and fourth part 343, the contact surface 34 may further include another section that can be in contact with the push member 264.

Hereinafter, the opening and closing operation of the door 20 of the refrigerator according to an embodiment of the present disclosure having the above structure will be described in more detail with reference to the drawings.

Figure 7:
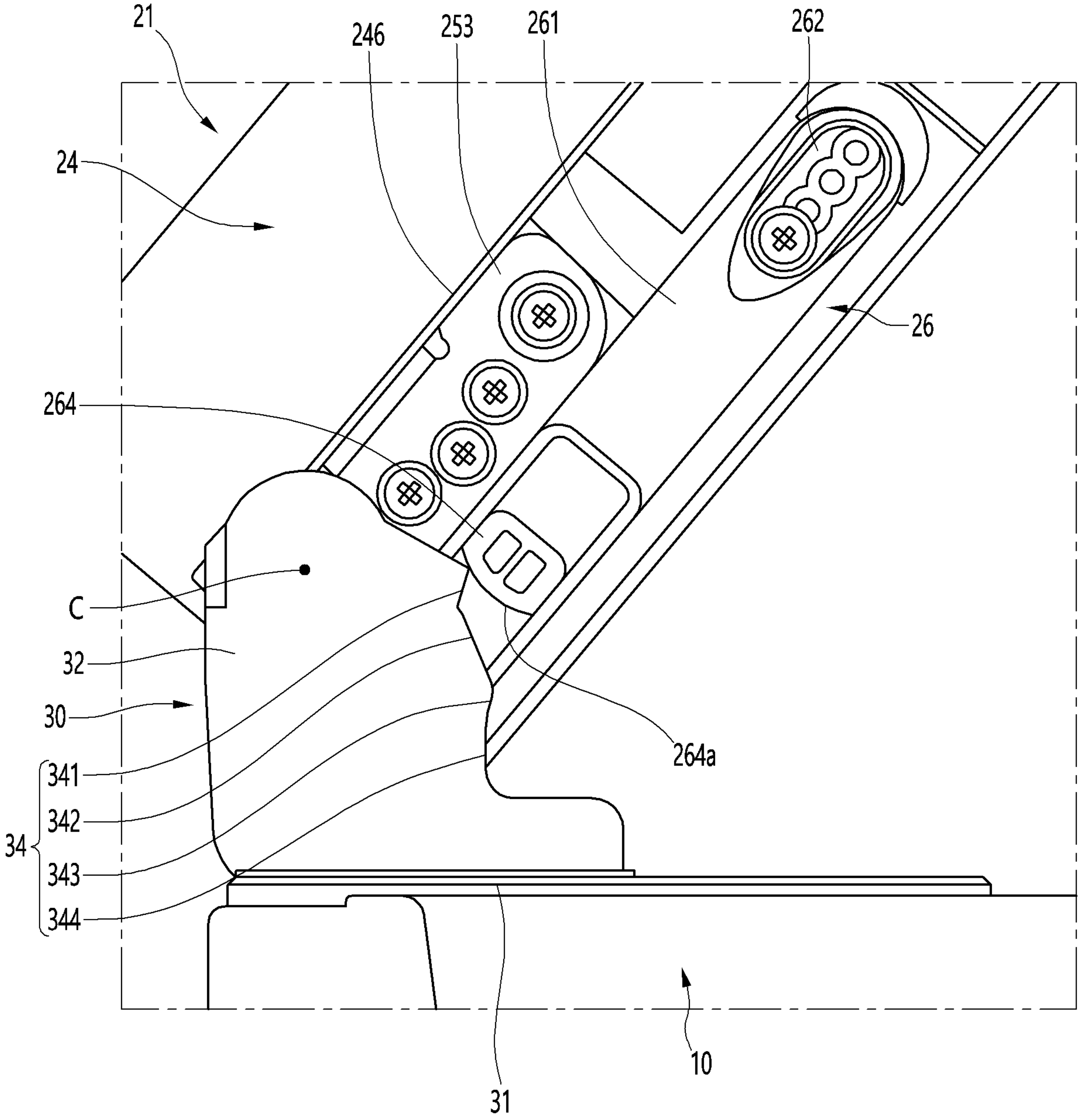
FIGS. 7 to 9 are views illustrating the contact state between the hinge and the damping device as the door rotates.
Figure 8:
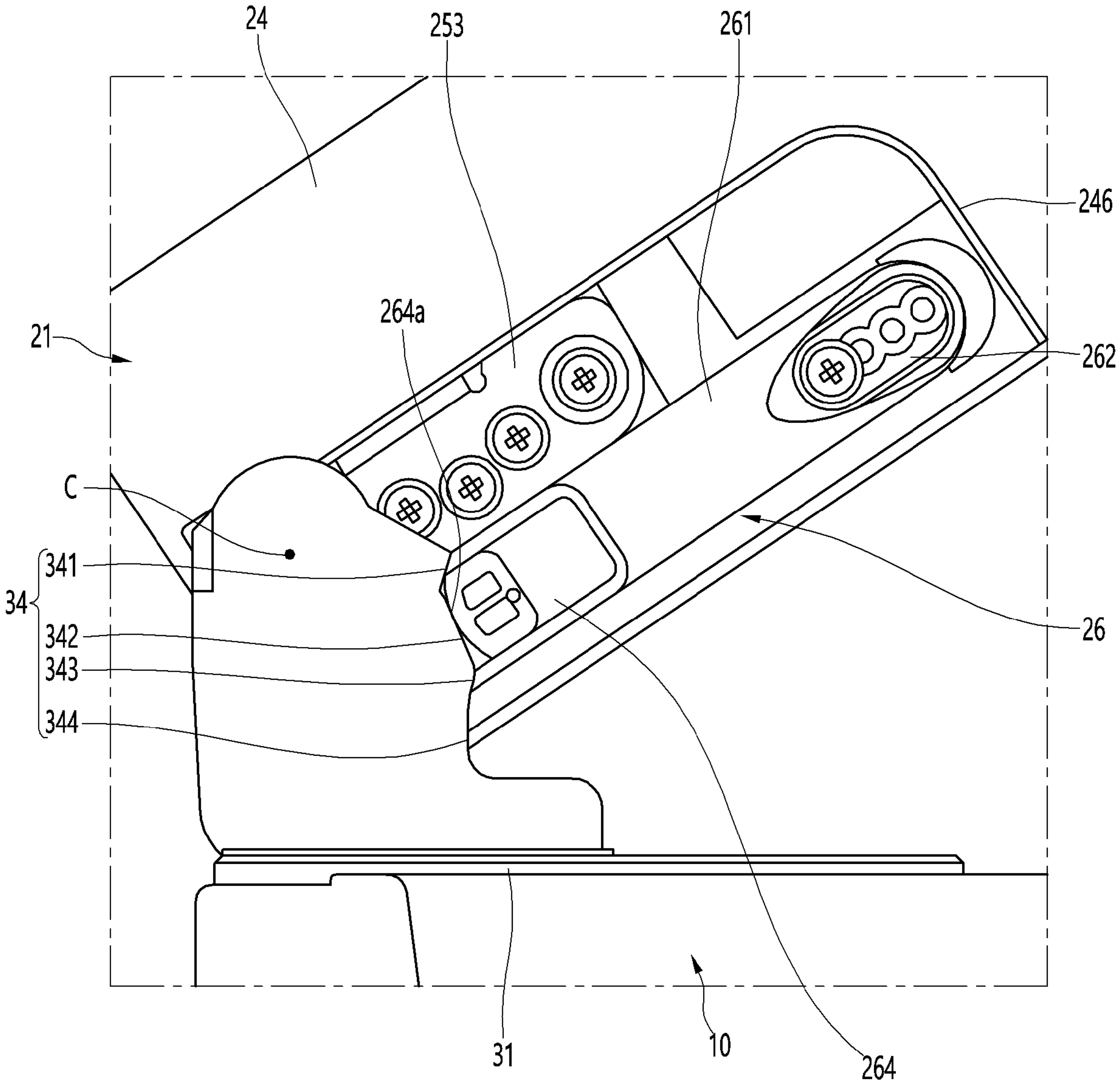
Figure 9:
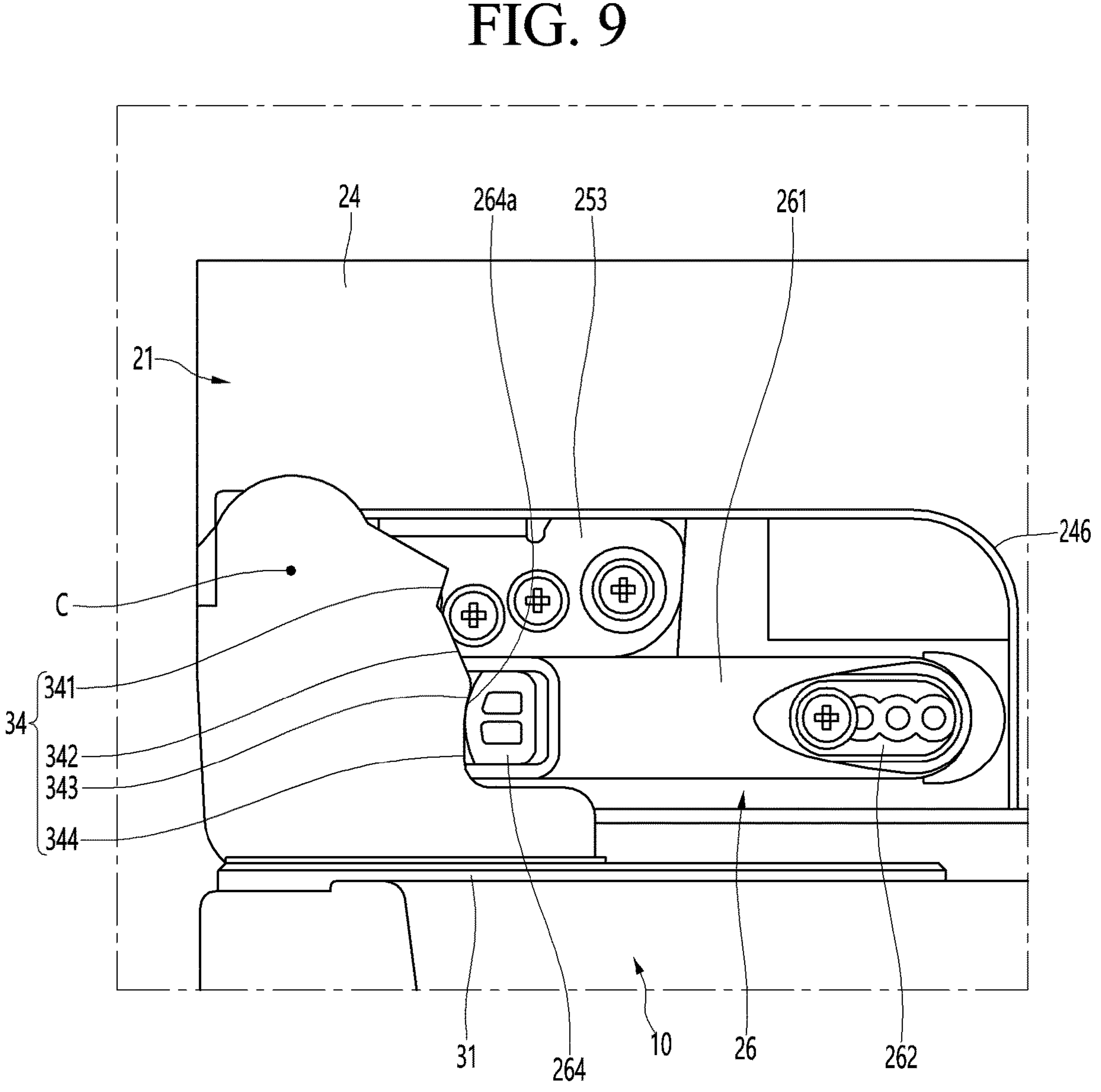

FIGS. 7 to 9 are views illustrating the contact state between the hinge and the damping device as the door rotates.

As illustrated in FIG. 6, when the door is open at a set angle $\alpha$1 or more, the user can close the door by rotating it. At this time, when the door reaches the set angle $\alpha$1 or less, the door is automatically closed by the auto-closing device.

In addition, in the process of closing the door, the damping device is not in contact with the hinge until the door reaches the set angle $\alpha$2. Therefore, force is applied only in the direction in which the door is closed, and the door can rotate quickly. Then, when the door reaches the set angle $\alpha$2, the damping device starts to be in contact with the contact surface, and the door closes smoothly while maintaining a constant speed.

In detail, as illustrated in FIG. 7, when the door 20 is closed by a set angle, the push member 264 may start contact through the first part 341 of the contact surface 34. For example, the set angle may be 40° to 32°. The rotational trajectory of the push member 264 in contact with the first part 341 may be positioned concentrically with the first part 341, so that the stroke of the push member 264 does not change.

In other words, the damping device 26 may not provide a damping force or may provide a fine damping force while the push member 264 passes in contact with the first part 341. Accordingly, the oil inside the damping device 26 may be ready to flow.

In addition, as illustrated in FIG. 8, when the door 20 is further rotated and the door 20 is closed by a set angle, the push member 264 is in contact with the second part 342. For example, the set angle may be 32° to 7°. The push member 264 generates a lateral force and moment by contact with the second part 342, and the damping force of the damping device 26 can be applied.

In particular, as the push member 264 moves from the starting point to the ending point of the second part 342, the stroke moved inside the housing 261 gradually increases, and the damping force increases. At this time, the push member 264 decelerates the door 20 to rotate smoothly as the lateral force and moment increase due to contact with the second part 342.

In other words, the push member 264 is prevented from moving rapidly due to the lateral force and moment applied to the push member 264, and the initial instantaneous fluid resistance rapidly increases in the damping device 26, and thus it is possible to prevent the door 20 from opening during the closing operation. In other words, even if excessive force is applied in the closing direction of the door 20, the door 20 may be closed at a constant speed while applying an appropriate damping force.

Then, when the door 20 is further rotated and the door 20 is closed by the set angle, the push member 264 is in contact with the third part 343. For example, the set angle may be 7° to 4°. When the door 20 is rotated in the closing direction, the push member 264 may be moved into a state of being in contact with the third part 343.

The rotational trajectory of the push member 264 in contact with the third part 343 may be positioned concentrically with the third part 343, so that the stroke of the push member 264 maintains a state of being unchanged. In other words, the damping device 26 does not provide a damping force while the push member 264 passes in contact with the third part 343. Therefore, in the process of closing the door 20, it is possible to pass the second part 342 and pass the third part 343 in a decelecerated state, and a rotational movement can be made to ensure that the door 20 is closed.

In addition, as illustrated in FIG. 9, when the door 20 is further rotated and the door 20 is closed by a set angle, the push member 264 is in contact with the second part 342. For example, the set angle may be 4° to 0°. The moment the door 20 is completely closed, the push member 264 is positioned on the fourth part 344, and the fourth part 344 may be in close contact with the contact part 264*a* of the push member 264. At this time, the inclined portion of the third part 343 may be in close contact with the upper end of the contact part 264*a*.

In addition, at the moment when the door 20 is completely closed, the fourth part 344 and the third part 343 are in close contact with the front end of the push member 264, so that the opening of the door 20 by reaction force may be prevented. In addition, due to the clastic force of the clastic member 265, the push member 264 is brought into closer contact with the fourth part 344 and the third part 343 to maintain the door 20 in a stably closed state.

At the last moment when the door 20 is closed, the push member 264 may be slightly moved inside the housing, thereby increasing the stroke and applying a damping force. At this time, the inertia of closing the door 20 and the rotational force of the auto-closing device 25 may be somewhat greater than the damping force, and therefore the speed at the moment when the door 20 is finally closed is reduced so that the door 20 can be closed without generating much noise or shock.

Meanwhile, as illustrated in FIG. 9, when the user opens the door 20 while the door 20 is closed, the push member 264 moves from the fourth part 344 to the third part 343.

At this time, the inclination or curvature of the third part 343 and the inclination or curvature of the push member 264 may correspond to each other. Therefore, even if the push member 264 moves from the fourth part 344 to the third part 343, the push member 264 is only slightly inserted into the housing 261 and the resistance of the oil does not occur significantly.

In addition, when the door 20 is further rotated in the opening direction, the push member 264 leaves the third part 343. At this time, the opening speed of the door 20 becomes faster than the speed at which the push member 264 moves by the clastic force of the clastic member 265. Accordingly, the push member 264 separates from the contact surface 34 while leaving the third part 343, and a damping force that acts as resistance when opening the door 20 is not generated. In other words, when opening the door 20, the user can smoothly open the door 20 without resistance caused by the damping device 26.

Meanwhile, the present disclosure may have various other embodiments in addition to the above-described embodiments. In the second embodiment of the present disclosure, the damping device is in contact with the hinge bracket to alleviate the impact when the door is closed. The second embodiment of the present disclosure differs only in a portion of the structure of the damping device and the hinge, and other structures may be the same. Therefore, the same reference numerals will be used for the same structures and detailed descriptions and illustrations thereof will be omitted.

Figure 10:
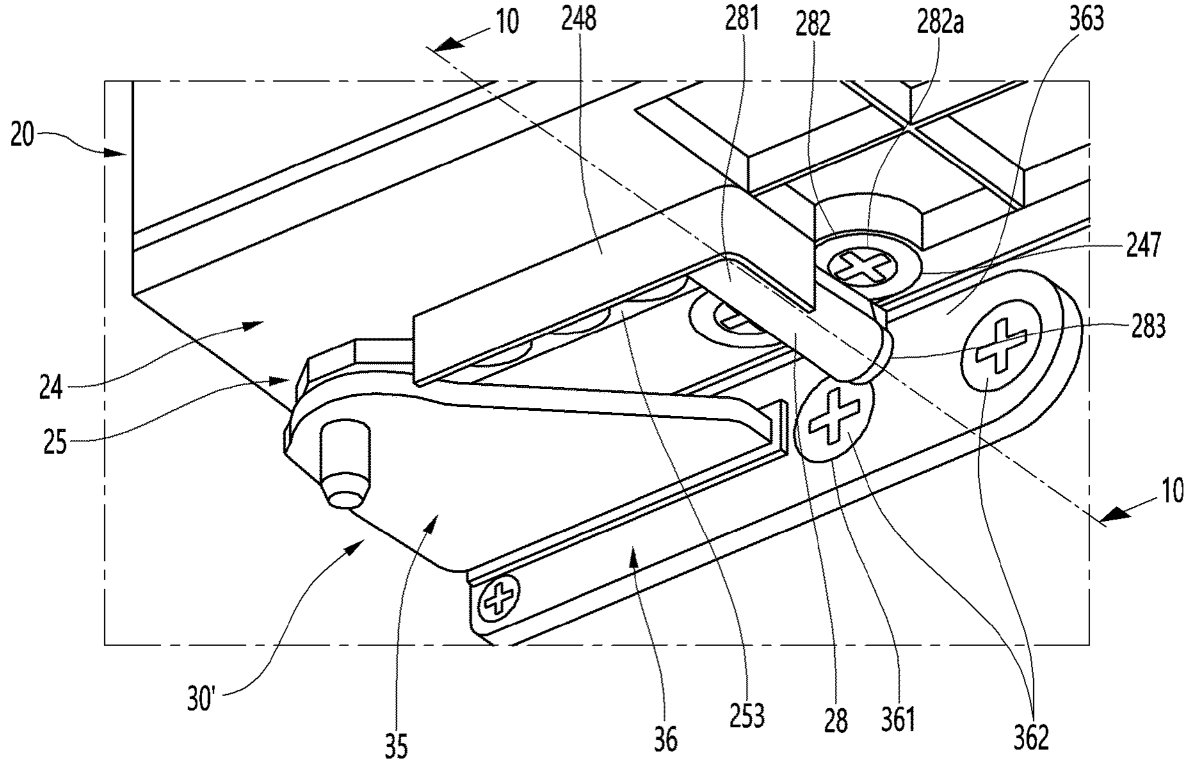
FIG. 10 is a partial perspective view illustrating the lower end of the door according to the second embodiment of the present disclosure.
Figure 11:
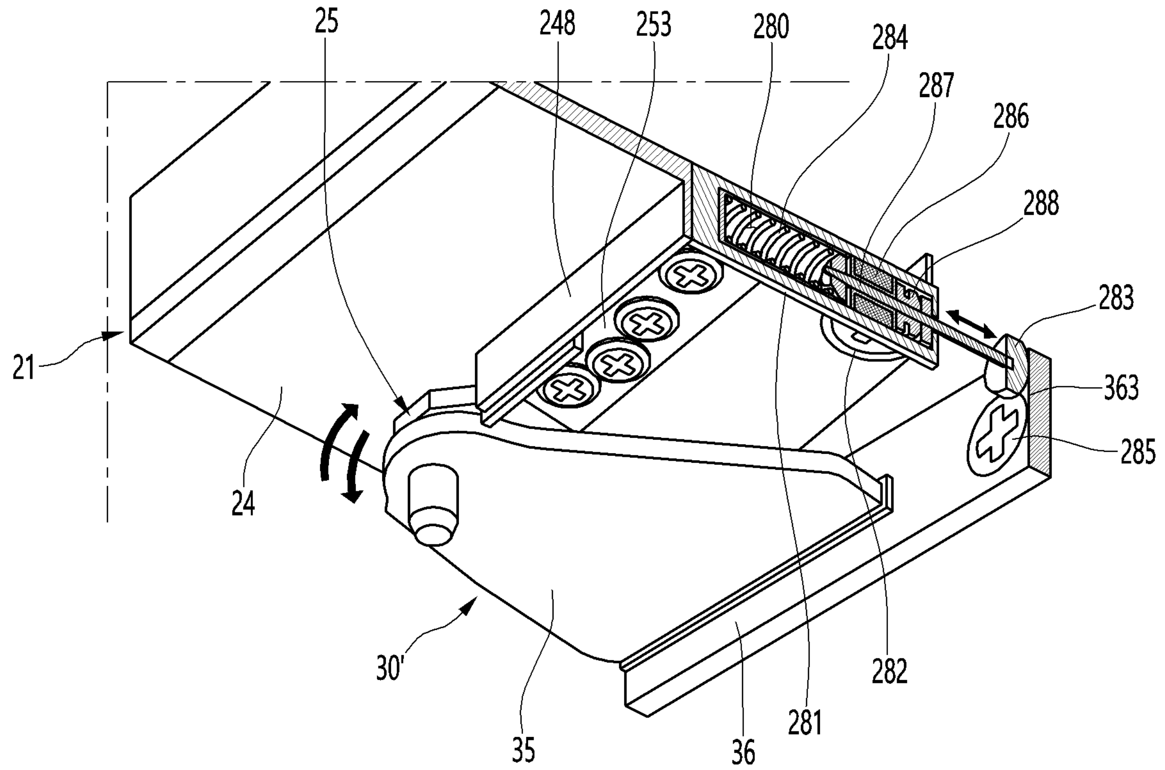
FIG. 11 is a perspective view taken by cutting along line 10-10 with the door being closed.
Figure 12:
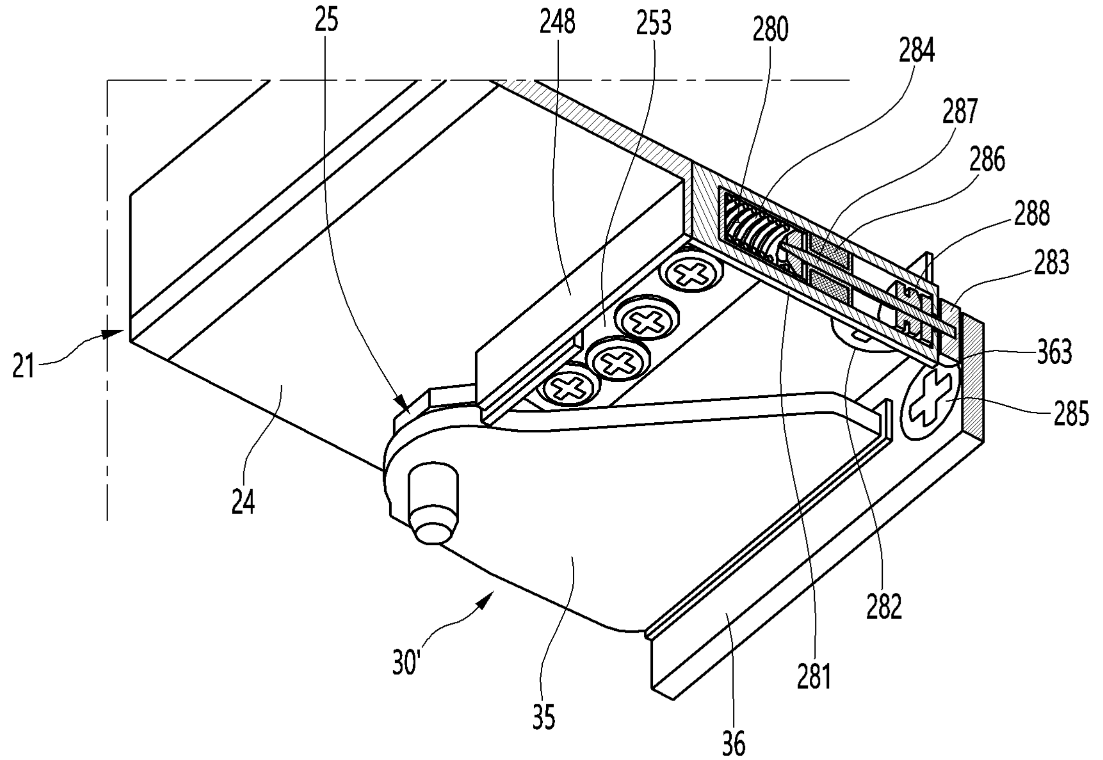
FIG. 12 is a perspective view taken by cutting along line 10-10 with the door closed.

FIG. 10 is a partial perspective view illustrating the lower end of the door according to the second embodiment of the present disclosure, FIG. 11 is a perspective view taken by cutting along line 10-10 with the door being closed, and FIG. 12 is a perspective view taken by cutting along line 10-10 with the door closed.

As illustrated, the lower surface of the door 20 of the refrigerator 1 according to the second embodiment of the present disclosure may be formed by the cap decoration 24. Additionally, the auto-closing device 25 may be mounted on the cap decoration 24. Additionally, the auto-closing device 25 may be mounted on the hinge 30'. Therefore, when the door 20 is rotated in the closing direction to a set angle or less, the door 20 may be closed by the auto-closing device 25. The auto-closing device 25 includes the case bracket 253, and a screw is fastened to the case bracket 253 to fix the auto-closing device 25 to the cap decoration 24.

The hinge 30' is mounted on the front surface of the cabinet 10 and may support the door 20 from below. The hinge 30' may be formed of a metal material. The hinge 30' may include the hinge bracket 36 mounted on the cabinet 10, and a hinge plate 35 extending in a direction crossing the hinge bracket 36, that is, in a front direction. The hinge plate 35 is provided with a hinge shaft 33, and the hinge shaft 33 may be coupled to the auto-closing device 25.

Meanwhile, the cap decoration 24 may be provided with the damping device 28. The damping device 28 may be configured as an oil damper, and the push member 283 of the damping device 28 may be configured to be in contact with the hinge 30'.

As an example, a buffer space 280 filled with oil may be provided inside the housing 281. Housing coupling parts 282 may be formed on both sides of the housing 281. A screw **282*a* is fastened to the housing coupling part 282 so that the damping device 28 is fixed to the lower surface of the cap decoration 24**.

Additionally, a piston 286 connected to a rod 287 may be provided inside the buffer space 280. An orifice is formed in the piston 286, and oil may pass through the orifice as the piston 286 moves. Additionally, the piston 286 may be supported by an elastic member 284. In addition, one open side of the housing 281 may be shielded by a sealing member 288. The rod 287 may extend from the inside of the buffer space 280 to the outside through the sealing member 288. Additionally, a push member 283 in contact with the hinge 30' may be provided at the end portion of the rod 287.

The shielding part 248 may be formed on the cap decoration 24. The shield 248 may protrude further downward than the damping device 28. Additionally, the damping device 28 can be prevented from being exposed when viewed from the front and one side. Additionally, the rear end of the damping device 28 may be supported in contact with the shielding part 248.

Meanwhile, a contact surface 363 in contact with the push member 283 may be provided on the front surface of the hinge bracket 36. The contact surface 363 may form at least a portion of the front surface of the hinge bracket 36 and may be formed at a position facing the damping device 28 when the door 20 is closed.

Hereinafter, the process of opening and closing the door 20 of the refrigerator 1 according to the second embodiment of the present disclosure will be described.

While the door 20 is open, the door 20 may be closed by a user's manipulation. The door 20 is rotated in the closing direction, and when the set angle is reached, the door 20 is automatically closed by the operation of the auto-closing device 25. In the process of closing the door, the rod 287 may protrude at the maximum stroke until the damping device 28 is in contact with the hinge 30'.

In this state, when the door 20 is closed at the set angle or less as illustrated in FIG. 10, the push member 283 is in contact with the hinge 30'. The push member 283 is in contact with the front contact surface 363 of the hinge bracket 36.

Accordingly, the rod 287 moves rearward, and the oil in the buffer space passes through the orifice and moves forward due to the rearward movement of the piston 286, generating oil resistance and providing a damping force on the door 20.

Even if the weight of the door 20 is heavy or the door 20 is closed at a high speed, the damping device 28 provides a damping force from the moment when the push member 283 is in contact with the contact surface 363 of the hinge bracket 36 to uniformly reduce the closing speed of the door 20.

The rod 287 and piston 286 are moved rearward until the door is completely closed as illustrated in FIG. 12, and the damping force due to the movement of the oil may be continuously applied to the door 20.

Therefore, even at the moment when the door 20 is closed, it is possible to prevent shock or noise from the door. In addition, as the door 20 is closed at a high speed, it is possible to prevent the door from opening due to repulsive force.

When the door 20 is closed, the push member 283 is maintained in contact with the contact surface 363 of the hinge bracket 36 by the elastic member 284 of the damping device 28. In addition, the moment when the user opens the door 20, the push member 283 separates from the contact surface 363. At this time, the moving speed of the piston 286 of the damping device 28 is slow due to the resistance of the oil, while the rotational speed of the door 20 becomes relatively significantly faster, and therefore, when the door 20 is opened, it becomes possible to open the door 20 without being influenced by the damping device 28.

Meanwhile, the present disclosure may have various other embodiments in addition to the above-described embodiments. In a third embodiment of the present disclosure, a damping device is provided on one side of the cabinet and is in contact with the door to alleviate the impact when the door is closed. In the third embodiment of the present disclosure, the same components as those of the above-described embodiment will be denoted by the same reference numerals, and detailed descriptions and illustrations thereof will be omitted.

Figure 13:
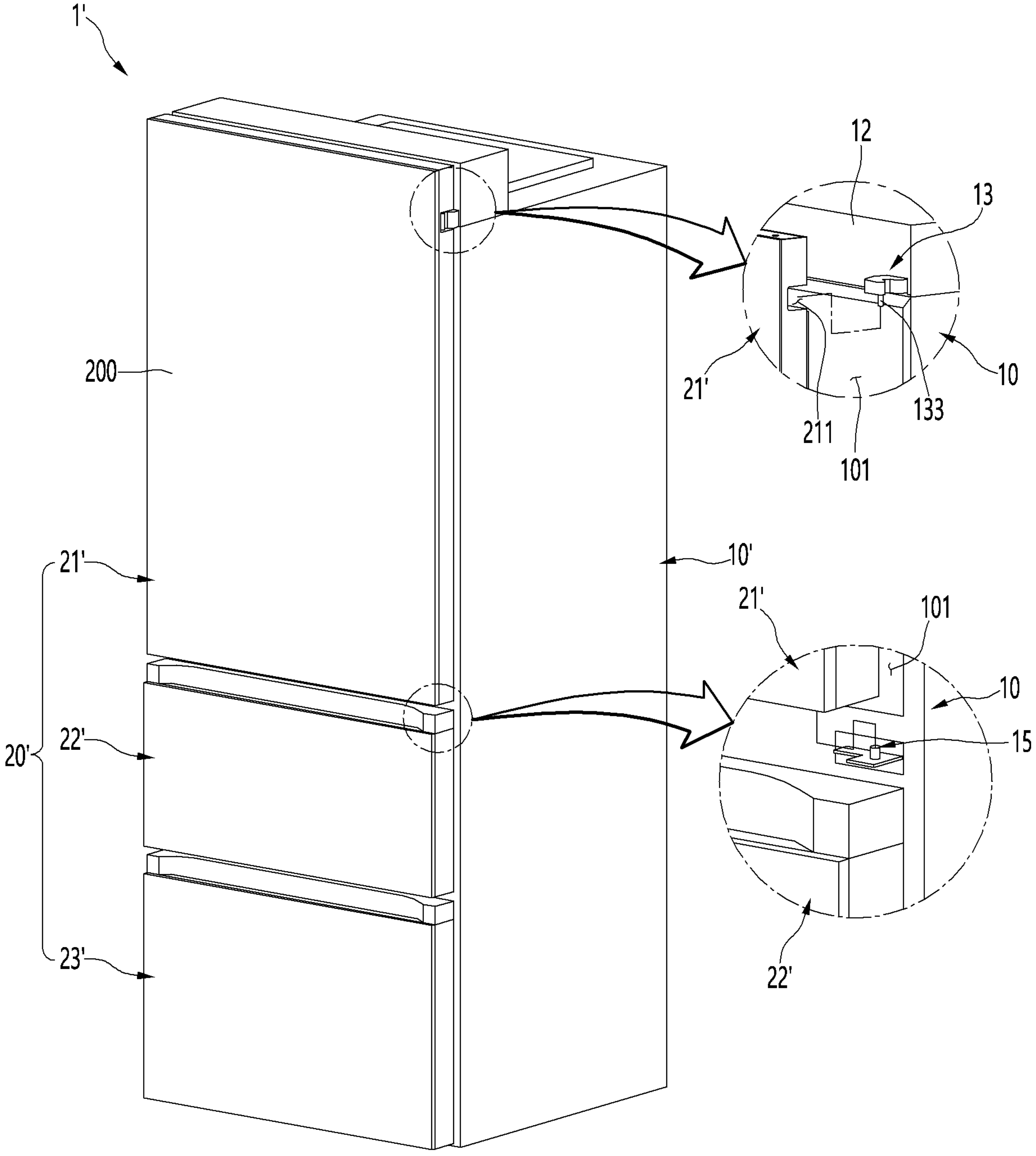
FIG. 13 is a perspective view illustrating a refrigerator according to a third embodiment of the present disclosure.

FIG. 13 is a perspective view illustrating a refrigerator according to a third embodiment of the present disclosure.

As illustrated in the drawing, the overall appearance of the refrigerator 1' according to the third embodiment of the present disclosure may be formed with a cabinet 10' forming a storage space with an open front surface, and a door 20' opening and closing the storage space 101.

The inside of the cabinet 10' may be divided up and down to form a plurality of storage spaces. Additionally, a plurality of doors 20' may be provided, and each door 20' may be configured to independently open and close the corresponding storage space 101. For example, the door 20' may include a first door 21', a second door 22', and a third door 23' that are sequentially disposed in the vertical direction. The first door 21' can open and close the storage space by rotating and may be referred to as a rotating door.

The door 20' may be configured in various ways according to the disposition of the storage space 101. In the present embodiment, an example provided with three doors will be described, but it should be noted in advance that the present disclosure is applicable to all refrigerators equipped with at least one rotating door.

The upper end and the lower end of the first door 21' is supported by the first hinge 13 and the second hinge 15, and the first door can be rotatably mounted on the cabinet 10. A panel 200 forming the outer appearance may be provided on the front surface of the first door 21'. For example, the panel 200 may be made of glass. Additionally, the first door 21' may be equipped with a door storage member, a dispenser, an ice maker, and the like.

The first door 21' may extend further upward of the cabinet 10' and may be rotatably connected by a first hinge 13 mounted on the cabinet 10'. The first hinge 13 is mounted on the upper surface of the cabinet 10', and may rotatably connect the upper portion of the first door 21' to the cabinet 10'. Additionally, the first hinge 13 may be located on one of the left and right upper surfaces of the cabinet 10'. Additionally, a top cover 12 is provided on the upper surface of the cabinet 10' to shield the first hinge 13. The first hinge may pass through the front surface of the top cover 12 and protrude forward.

The first hinge 13 may include a first hinge shaft 131 protruding downward. In addition, the first hinge shaft 131 may be axially coupled to the hinge mounting part 211 formed on the upper portion of the first door 21'.

Hereinafter, the first hinge 13 of the first door 21' and its related structure will be described. For convenience of explanation, the first door 21' may be referred to as a door 20', and the first hinge 13 may be referred to as a hinge 13.

Figure 14:
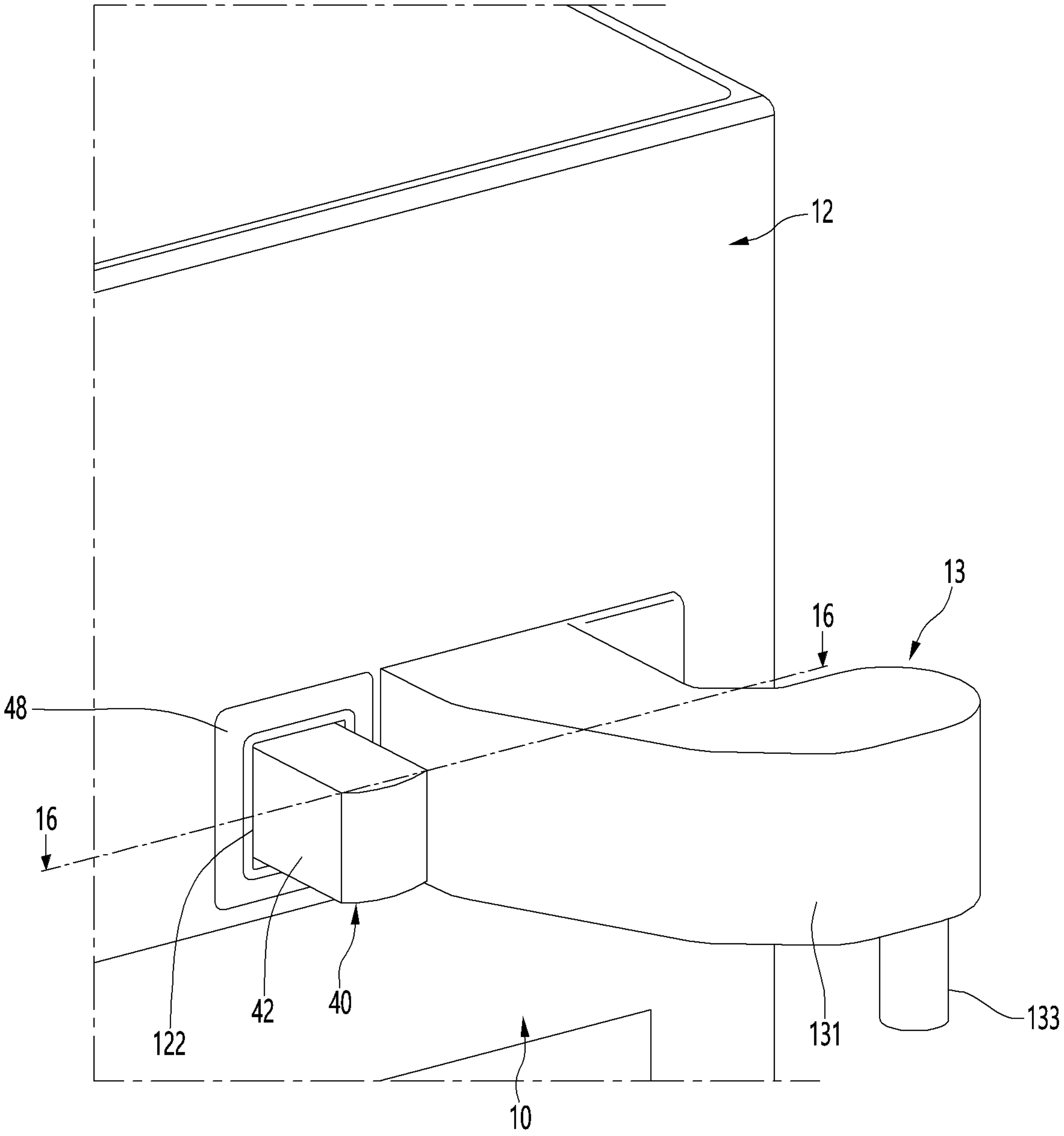
FIG. 14 is a partial perspective view illustrating the disposition of the first hinge and damping device of the refrigerator.
Figure 15:
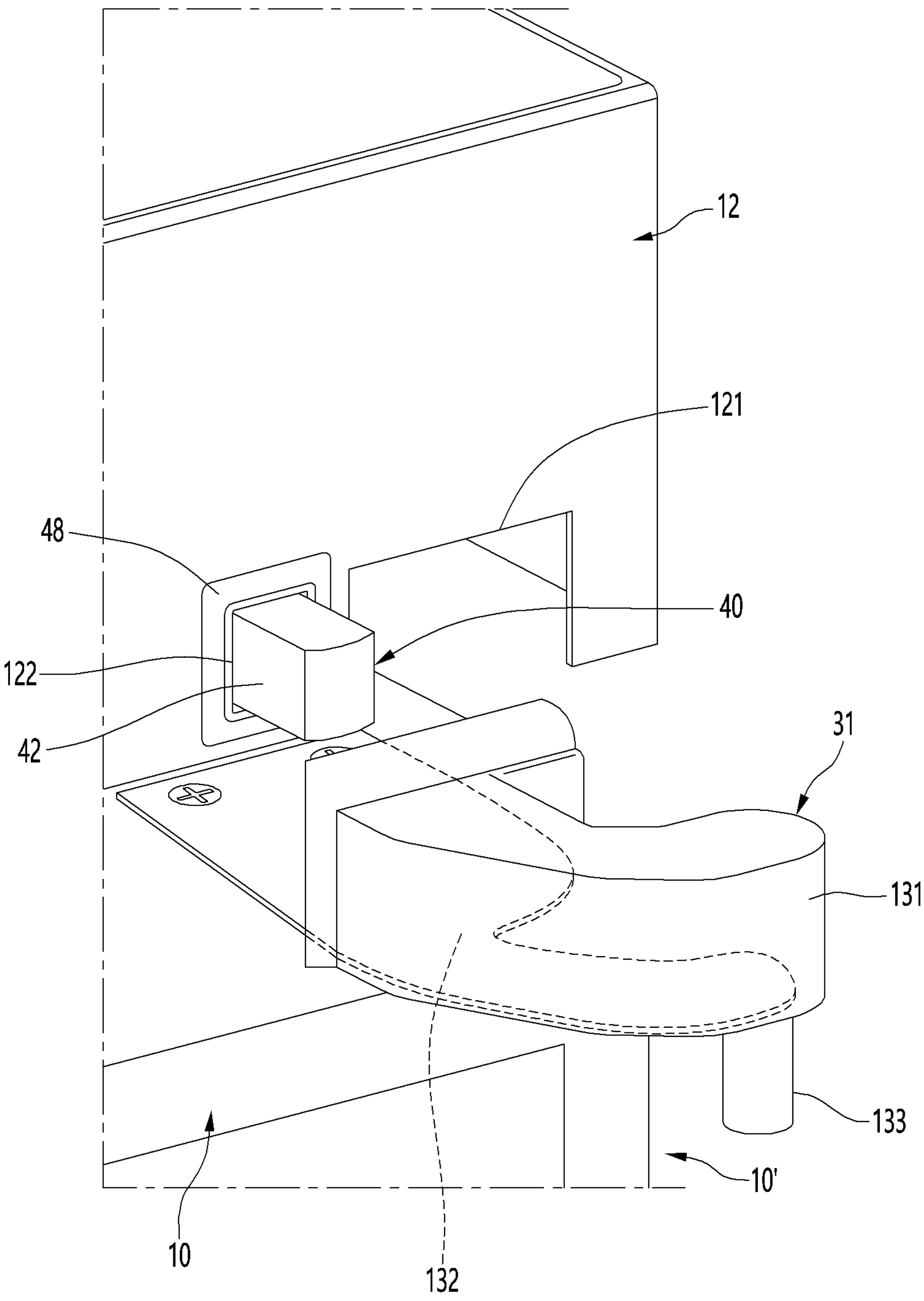
FIG. 15 is an exploded perspective view illustrating the first hinge and damping device.
Figure 16:
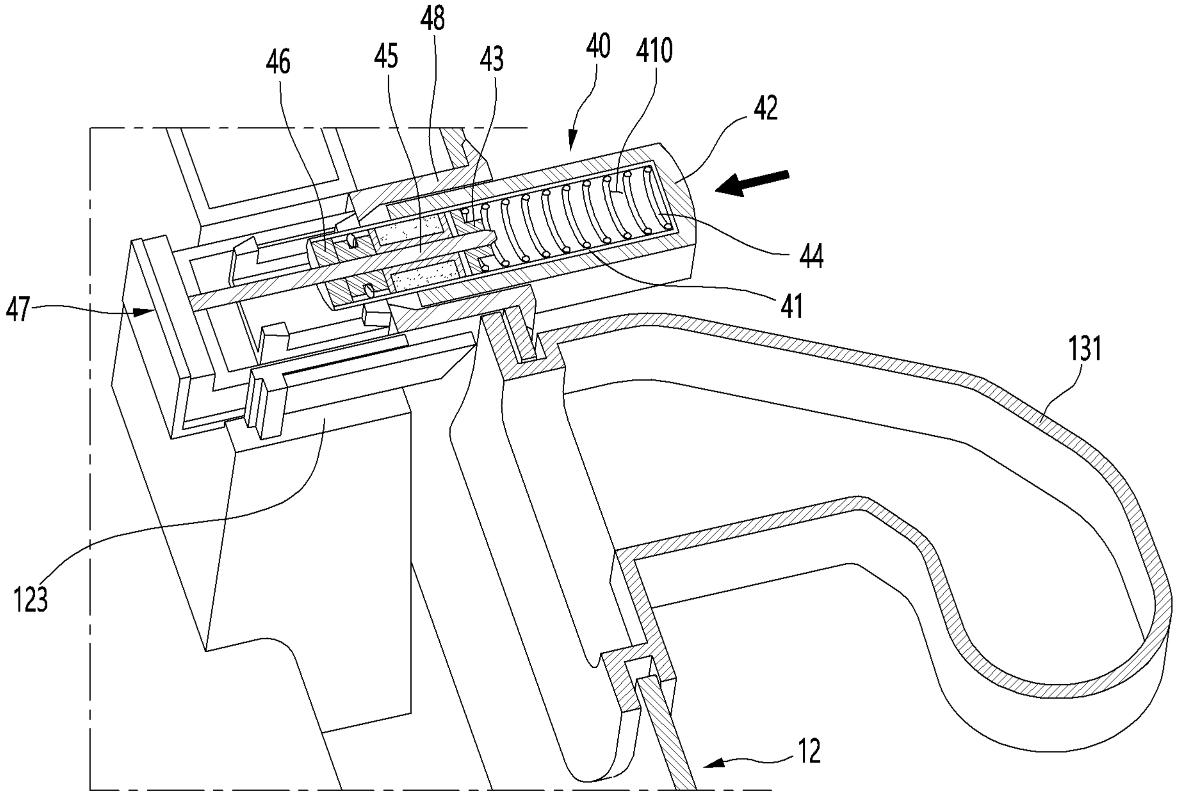
FIG. 16 is a perspective view taken by cutting along line 16-16 of FIG. 14.

FIG. 14 is a partial perspective view illustrating the disposition of the first hinge and damping device of the refrigerator, FIG. 15 is an exploded perspective view illustrating the first hinge and damping device, and FIG. 16 is a perspective view taken by cutting along line 16-16 of FIG. 14.

As illustrated, the hinge 13 may include a hinge plate 132, a hinge shaft 133, and a hinge cover 131.

The hinge plate 132 and the hinge shaft 133 may be formed of a metal material. The hinge plate 132 may be fixedly mounted on the upper surface of the cabinet 10' and may protrude toward the front of the cabinet 10'. In addition, the hinge shaft 133 extends downward from the protruding end portion of the hinge plate 132 and may be axially coupled to the hinge mounting part 211.

The hinge cover 131 is for shielding the hinge plate 132 and the hinge shaft 133 protruding from the cabinet 10'. The hinge cover 131 has an open lower surface to accommodate the hinge plate 132 therein, and may be formed in a shape corresponding to the hinge plate 132. In addition, the opened rear end of the hinge cover 131 can be mounted on the top cover 12.

The top cover 12 is mounted on the upper surface of the cabinet 10' and may form a portion of the front surface of the cabinet 10'. Additionally, a cover mounting part 121 to which the rear end of the hinge cover 131 is coupled may be opened at the front surface of the top cover 12.

Additionally, a damping device 40 may be mounted on the top cover 12. The damping device 40 is in contact with the rear surface of the door 20' to keep the closing speed of the door 20' constant when the door 20' is closed, and may be configured as an oil damper.

In detail, the damping device 40 includes a housing 41 in which a buffer space 410 that accommodates oil is formed, and a push member 42 may be mounted on one end of the housing 41. The push member 42 can accommodate the remaining part of the housing 41 except the rear end thereof, and can form most of the outer appearance exposed to the outside of the top cover 12. Additionally, the push member 42 may be formed of a soft material. Additionally, the housing 41 and the push member 42 may be integrally formed.

The damping device 40 may further include a piston 43 accommodated inside the buffer space 410 and an elastic member 44 supporting the piston 43. Additionally, an orifice may be formed in the piston 43 through which oil passes when the piston 43 moves. A rod 45 is connected to the piston 43, and the rod 45 may extend rearwardly through a sealing member 46 that shields the open rear surface of the buffer space 410. Additionally, the extended rear end of the rod 45 may be supported on the case 47 that forms a portion of the outer appearance of the damping device 40.

The damping device 40 may be mounted inside the top cover 12 in an assembled state. A case mounting part 123 to which the case 47 is fixedly mounted may be formed on the inner surface of the top cover 12. Additionally, a push member opening 122 through which the push member 42 passes may be formed on the front surface of the top cover 12. Additionally, a guide member 48 may be mounted around the push member opening 122 to guide the mounting of the push member 42 and the entry and exit of the push member 42.

The push member opening 122 may be located parallel to the side of the cover mounting part 121. Additionally, the push member 42 may be in contact with a side of the back of the door 20' adjacent to the hinge mounting part 211. Accordingly, the rotational speed of the door 20' can be effectively reduced in the process of closing the door 20', and in particular, it is possible to effectively transmit damping force while shortening the stroke of the push member 42. Additionally, the damping device 40 can be prevented from protruding excessively.

Hereinafter, the operation of opening and closing the door 20' will be described with reference to the drawings.

Figure 17:
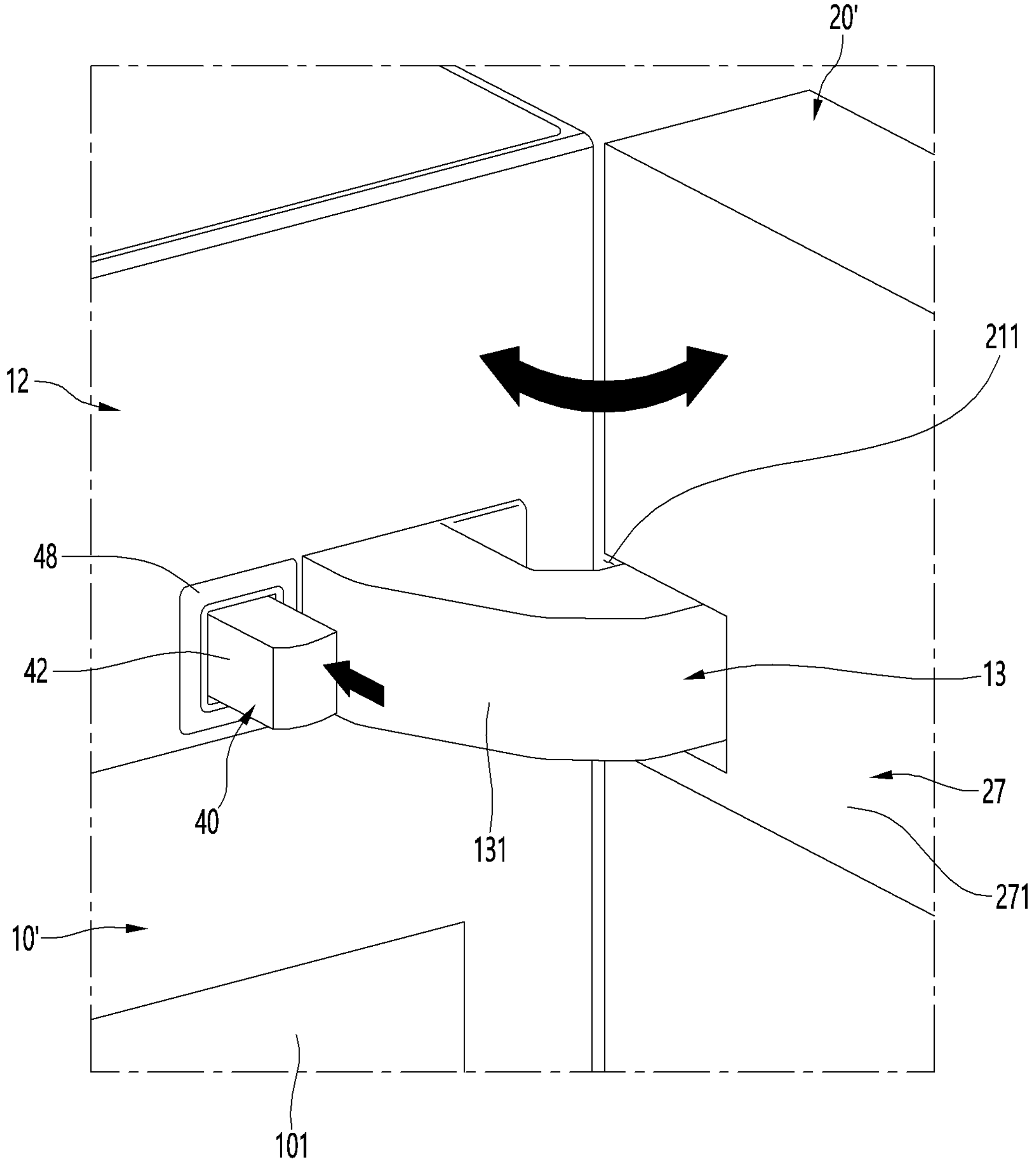
FIG. 17 is a partial perspective view illustrating the state of the damping device according to the rotation of the door.

FIG. 17 is a partial perspective view illustrating the state of the damping device according to the rotation of the door.

As illustrated, the door 20' can be rotated by the hinge 13 during opening and closing operations. In addition, when the door 20' is opened at a set angle or more, the damping device 40 and the door 20' is not in contact with each other, and the push member 42 may be maintained in the maximum protruding state thereof.

At this time, the push member 42 may be disposed on a side adjacent to the hinge cover 131, and thus may be in harmony with the hinge cover 131 and may be configured so as not to create a sense of heterogeneity.

In this state, the door 20' may be opened and closed according to the force applied by the user when opening and closing the door 20'. The auto-closing device 25 as in the above-described embodiment may be provided so that the door 20' can be rotated to automatically close before being in contact with the damping device 40.

When the door 20' is rotated in the closing direction by a set angle or more, the rear surface of the door 20' may be in contact with the protruding front surface of the push member 42. At this time, the push member 42 may be in contact with the upper cap decoration 27 that forms the upper portion of the door 20'. Accordingly, the rear surface of the upper cap decoration 27 may serve as a contact surface. Additionally, the hinge mounting part 211 may also be formed on the upper cap decoration 27.

The moment when the front end of the push member 42 is in contact with the rear surface of the door 20', that is, the contact surface 271, the push member 42 moves rearward, and the piston 43 relatively moves in the buffer space 410, resistance of the oil may be generated, and a damping force may be applied. Accordingly, the closing speed of the door 20' can be reduced, and the speed is reduced until the final closing moment, allowing the door 20' to close smoothly.

When the door 20' is closed, the push member 42 is maintained in contact with the contact surface 271 of the door 20' by the clastic member 44 of the damping device 40. In addition, the moment when the user opens the door 20', the push member 42 separates from the contact surface 271. At this time, while the moving speed of the piston 43 of the damping device 40 is slow due to the resistance of the oil, the rotational speed of the door 20' becomes relatively significantly faster, so when the door 20' is opened, it becomes possible to open the door 20' without being affected by the damping device 40.

The present disclosure may have various other embodiments in addition to the above-described embodiments. In the fourth embodiment of the present disclosure, a damping device is provided on one side of the cabinet, and is in contact with the door to alleviate the impact when the door is closed. In the third embodiment of the present disclosure, the same components as those of the above-described embodiment will be denoted by the same reference numerals, and detailed descriptions and illustrations thereof will be omitted.

Figure 18:
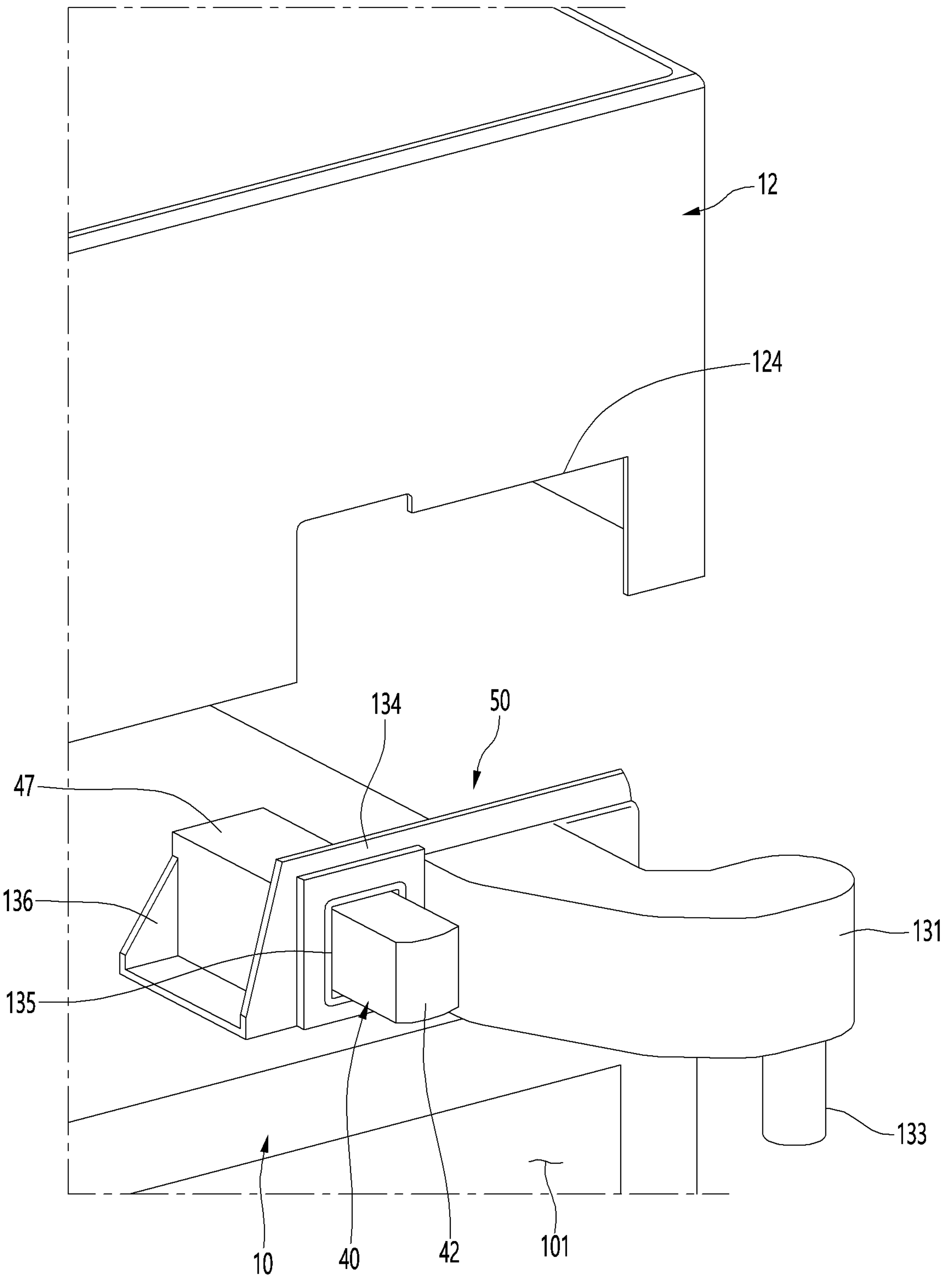
FIG. 18 is an exploded perspective view illustrating the first hinge and damping device of the refrigerator according to the fourth embodiment of the present disclosure.

FIG. 18 is an exploded perspective view illustrating the first hinge and damping device of the refrigerator according to the fourth embodiment of the present disclosure.

As illustrated in the drawing, a hinge device 50 may be mounted on the upper surface of the cabinet 10' of the refrigerator 1' according to the fourth embodiment of the present disclosure. The hinge device 50 may include a hinge 13 to which the door 20' is rotatably coupled, and a damping device 40 that reduces the closing speed of the door 20'.

In detail, the hinge 13 may include a hinge plate 132 fixed to the cabinet 10', a hinge shaft 133 protruding from the hinge plate 132, and a hinge cover 131 covering the hinge plate 132 and the hinge shaft 133.

In addition, the hinge cover 131 may further include a cover front surface portion 134 mounted on the hinge opening 124 of the top cover 12. The cover front surface portion 134 may shield the hinge opening 124 and extend laterally to form a space in which the damping device 40 is mounted.

The damping device 40 may protrude forward through the opening 135 of the cover front surface part 134. Additionally, a damping device mounting part 136 on which the damping device 40 is mounted may be formed at the rear surface of the cover front surface portion 134. Accordingly, the damping device 40 may be fixedly mounted on the hinge cover 131 and may be configured as an assembly with the hinge 13.

Accordingly, the hinge device 50 can be mounted on the cabinet 10' with the hinge 13 and the damping device 40 mounted on the hinge cover 131, and may be shielded by the top cover 12. In addition, when the hinge device 50 is mounted, the push member 42 of the damping device 40 protrudes through the hinge cover 131, and when the door 20' is closed, the push member 42 of the damping device 40 is in contact with the contact surface 271 of the rear surface of the door 20' and thus the door 20' may be decelerated. In addition, the damping device 40 is composed of an oil damper as in the above-described embodiment and transmits a damping force to the door.

What is claimed is:

1. A refrigerator comprising:

a cabinet having a storage space;

a door configured to open and close the storage space;

a hinge connecting the door to the cabinet; and a damper provided apart from the hinge, the damper being configured to provide a damping force to the door when the door rotates towards a closed position; and an auto-closing device disposed at the door, wherein the auto-closing device is configured to provide a closing force to the door to assist rotation of the door towards the closed position when the door is at a first preset angle or less with respect to the closed position, wherein the hinge includes a contact surface configured to contact the damper when the door is at a second preset angle or less with respect to the closed position to transmit the damping force to the door and to be spaced from the damper when the door is at an angle greater than the second preset angle, wherein the first preset angle is greater than the second preset angle.

2. The refrigerator of claim 1, wherein the contact surface includes:

a first rounded portion;

a second rounded portion spaced from the first rounded portion; and a pressing portion extending between the first rounded portion and the second rounded portion, the pressing portion being configured to increase the damping force as the door is rotated towards the closed position.

3. The refrigerator of claim 2, wherein the hinge includes a hinge shaft, and wherein a distance from the hinge shaft to the pressing portion increases from a starting point of the pressing portion to an ending point of the pressing portion in a rotation direction in which the door is moved towards the closed position.

4. The refrigerator of claim 3, wherein the contact surface further includes a starting portion configured to be brought into contact with the damper when the door is at the second preset angle, the starting portion including the first rounded portion, and wherein a distance from the hinge shaft between a starting point of the starting portion and an ending point of the starting portion does not increase in the rotation direction in which the door is moved towards the closed position.

5. The refrigerator of claim 4, wherein the contact surface further includes a restraining portion configured to maintain contact with the damper when the door is in the closed position, the second rounded portion being located between the restraining portion and the pressing portion, and wherein a distance from the hinge shaft to the restraining portion increases from a starting point of the restraining portion to an ending point of the restraining portion in the rotational direction in which the door is moved towards the closed position.

6. The refrigerator of claim 5, wherein a difference in the distances between the starting point of the restraining portion and the ending point of the restraining portion from the hinge shaft is smaller than a difference in the distances between the starting point of the pressing portion and the ending point of the pressing portion from the hinge shaft.

7. The refrigerator of claim 6, wherein the damper includes:

a housing having a space to accommodate oil therein;

a push member configured to be displaceable with respect to the door, the push member having a contact portion configured to contact the contact surface;

a piston configured to move within the space as the push member moves; and an elastic member located in the space, the elastic member being configured to provide an elastic force to the piston.

8. The refrigerator of claim 1, wherein the hinge includes a hinge shaft, and wherein the contact surface includes:

a starting portion configured to be brought into contact with the damper when the door is at the second preset angle, wherein a distance from the hinge shaft between a starting point of the starting portion and an ending point of the starting portion does not increase in a rotation direction in which the door is moved towards the closed position;

a pressing portion extending from the starting portion, the pressing portion being configured to increase the damping force as the door is rotated towards the closed position, a distance from the hinge shaft to the pressing portion increasing from a starting point of the pressing portion to an ending point of the pressing portion in a rotation direction in which the door is moved towards the closed position;

a restraining portion configured to maintain contact with the damper when the door is in the closed position; and a holding portion located between the pressing portion and the restraining portion, the holding portion extending from the pressing portion such that distances from the hinge shaft to the holding portion between a starting point of the holding portion and an ending point of the holding portion do not increase in the rotation direction in which the door is moved towards the closed position.

9. The refrigerator of claim 8, wherein the damper includes:

a housing having a space to accommodate oil therein;

a push member configured to be displaceable with respect to the door, the push member having a contact portion configured to contact the contact surface, the contact portion of the push member and the holding portion of the contact surface having corresponding shapes;

a piston configured to move within the space as the push member moves; and an elastic member located in the space, the elastic member being configured to provide an elastic force to the piston.

10. The refrigerator of claim 8, wherein the holding portion protrudes further in a direction in which the damper is located than in a direction in which the restraining portion and the pressing portion are located.

11. The refrigerator of claim 8, wherein a length of the starting portion is longer than a length of the holding portion.

12. The refrigerator of claim 1, wherein the hinge includes:

a hinge bracket mounted on a front surface of the cabinet; and a hinge plate extending in a longitudinal direction of the hinge bracket, the hinge plate including a hinge shaft rotatably coupled to the door, and wherein the contact surface extends along a circumferential surface of the hinge plate.

13. The refrigerator of claim 12, wherein the damper is located opposite the circumferential surface of the hinge plate, and wherein the damper is configured to be in contact with the hinge plate when the door rotates from the second preset angle towards the closed position and is configured to be spaced apart from the hinge plate for at least a portion of a rotation from the closed position towards the second preset angle.

14. The refrigerator of claim 1, wherein the door includes a cap decoration defining a lower surface thereof, wherein the hinge is rotatably coupled to the cap decoration, the contact surface being provided on the hinge, and wherein the damper is located on the cap decoration.

15. The refrigerator of claim 14, wherein the cap decoration further includes a shielding portion extending past a front of the hinge and the damper and protruding downward from the cap decoration to shield at least a portion of the hinge and the damper.

16. The refrigerator of claim 1, wherein the hinge includes a hinge shaft, wherein the auto-closing device is disposed on a same extension line as a rotation center of the door, and wherein the auto-closing device is coupled with the hinge shaft.

17. The refrigerator of claim 16, wherein the auto-closing device includes:

a case inserted into the door;

a spring accommodated inside the case and configured to provide elastic force in a direction in which the door closes; and a shaft coupling part coupled to the spring and the hinge shaft, wherein the shaft coupling part is configured to rotate together with the hinge shaft when the door rotates to provide elastic force so that the door can be automatically closed.

* * * * *